(12) United States Patent
Byun et al.

(10) Patent No.: US 12,119,568 B2
(45) Date of Patent: Oct. 15, 2024

(54) ELECTRONIC DEVICE

(71) Applicants: Samsung Display Co., Ltd., Yongin-Si (KR); UNIST(ULSAN NATIONAL INSTITUTE OF SCIENCE AND TECHNOLOGY), Ulsan (KR)

(72) Inventors: Gangil Byun, Ulsan (KR); Jae-Kyoung Kim, Hwaseong-si (KR); Eunjin Sung, Yongin-si (KR); Kiseo Kim, Yongin-si (KR); Jinmyeong Heo, Ulsan (KR)

(73) Assignees: Samsung Display Co., Ltd., Gyeonggi-Do (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 81 days.

(21) Appl. No.: 17/830,734

(22) Filed: Jun. 2, 2022

(65) Prior Publication Data

US 2023/0046168 A1 Feb. 16, 2023

(30) Foreign Application Priority Data

Aug. 11, 2021 (KR) .................. 10-2021-0105741

(51) Int. Cl.
*H01Q 1/24* (2006.01)
*H01Q 9/04* (2006.01)
*H04M 1/02* (2006.01)

(52) U.S. Cl.
CPC ............ *H01Q 9/045* (2013.01); *H01Q 1/241* (2013.01); *H04M 1/026* (2013.01)

(58) Field of Classification Search
CPC ............ H01Q 1/36; H01Q 1/38; H01Q 1/241; H01Q 1/243; H01Q 5/364; H01Q 5/371;

(Continued)

(56) References Cited

U.S. PATENT DOCUMENTS 7,847,748 B1 * 12/2010 McKinley ............ H01Q 9/0435
343/756
10,381,750 B2 8/2019 Jung et al.
(Continued)

FOREIGN PATENT DOCUMENTS

CN 114696079 A * 7/2022 ............... H01Q 1/22
KR 10-2019-0019802 A 2/2019
(Continued)

OTHER PUBLICATIONS

Gentili G B et al: "Design of Dual-Polarized Series-Fed Microstrip Arrays With Low Losses and High Polarization Purity", IEEE Transactions on Antenna and Propagation, IEEE, USA, vol. 53, No. 5, May 1, 2005, pp. 1791-1798, ISSN: OOI DOI: 10.1 109/TAP. 2005.846732 (Year: 2005).*

(Continued)

*Primary Examiner* — Thai Pham
(74) *Attorney, Agent, or Firm* — Innovation Counsel LLP

(57) ABSTRACT

Provided is an electric device including a display panel, and a first antenna disposed on the display panel and including a first patch part, a first transmission part, and a first additional transmission part, wherein the first transmission part faces a first side of the first patch part extending along a first cross direction, is spaced apart from the first patch part, and is capacitively coupled to the first patch part, and wherein the first additional transmission part faces a second side of the patch part extending in a second cross direction crossing the first cross direction, is symmetrical about a line of symmetry with the first transmission part, and is spaced apart from the first patch part.

24 Claims, 32 Drawing Sheets

(58) Field of Classification Search
CPC .... H01Q 5/385; H01Q 9/0457; H01Q 9/0407; H01Q 9/045; H01Q 21/065; H01Q 21/08; H01Q 21/24
See application file for complete search history.

(56) References Cited

U.S. PATENT DOCUMENTS

| | | | | |
|---|---|---|---|---|
| 2019/0058264 | A1* | 2/2019 | Jung | H01Q 9/0435 |
| 2022/0140482 | A1* | 5/2022 | Lee | H05K 1/0243 |
| | | | | 343/905 |
| 2022/0209414 | A1* | 6/2022 | Byun | H10K 59/40 |
| 2022/0247083 | A1* | 8/2022 | Kim | H01Q 21/0075 |

FOREIGN PATENT DOCUMENTS

| | | |
|---|---|---|
| KR | 10-2000121 B1 | 7/2019 |
| KR | 10-2007876 B1 | 8/2019 |
| KR | 10-2020-0144076 A | 12/2020 |

OTHER PUBLICATIONS

D.G.Kurup et al., "Compact microstrip-T coupled patch antenna for dual polarisation and active antenna applications", Electronics Letters Oct. 10, 2002 vol. 38 No. 21.

Andrea Vallecchi et al., "Design of Dual-Polarized Series-Fed Microstrip Arrays With Low Losses and High Polarization Purity", IEEE Transactions on Antennas and Propagation. vol. 53, No. 5, May 2005.

Lei Zhu et al., "Line-to-ring coupling circuit model and its parametric effects for optimized design of microstrip ring circuits and antennas," 1997 IEEE MTT-S International Microwave Symposium Digest, Denver, CO, USA, 1997, pp. 289-292 vol. 1, doi: 10.1109/MWSYM.1997.604576.

S. Ononchimeg et al., "A New Dual Polarized Gap Fed Patch Antenna," Progress In Electromagnetics Research C, vol. 14, 79-87, 2010. doi:10.2528/PIERC10050405.

G. F. Hamberger et al., "A single layer dual linearly polarized microstrip patch antenna array for automotive applications in the 77 GHz band student submission," 2016 IEEE International Symposium on Phased Array Systems and Technology (PAST), Waltham, MA, USA, 2016, pp. 1-4, doi:10.1109/ARRAY.2016.7832609.

James, J. R., & Hall, P. S. (2011). Handbook of microstrip antennas: vol. 1 (J. R. James & P. S. Hall, Eds.). Retrieved from https://www.perlego.com/book/574073/handbook-of-microstrip-antennas-pdf.

Wójcik, D. et al., "Low cost dual polarized suspended microstrip antenna array for 5.8 GHz point to point links," Retrieved from https://www.semanticscholar.org/paper/3e59cee0883f872b95fe7d0d0d38b9b48709df07.

D.G. Kurup et al., "Compact microstrip-T coupled patch antenna for dual polarisation and active antenna applications", IEE 2002, Electronics Letters, Oct. 10, 2002, vol. 38 No. 21 , 2 pages.

* cited by examiner

ELECTRONIC DEVICE

CROSS-REFERENCE TO RELATED APPLICATIONS

This U.S. non-provisional patent application claims priority under 35 U.S.C. § 119 to Korean Patent Application No. 10-2021-0105741, filed on Aug. 11, 2021, the entire contents of which are hereby incorporated by reference.

BACKGROUND

The present disclosure herein relates to a communicable electronic device.

An electronic device supporting wireless communication may include an antenna, the antenna may be disposed inside the electronic device, or transmit or receive a signal in a specific frequency range by taking, as a radiator, a metal material forming an outer shape of the electronic device. The electronic device may include antennas for wireless communication such as a cellular network, WiFi, or Bluetooth.

SUMMARY

The present disclosure provides an electronic device of which antenna bandwidth is improved.

An embodiment of the inventive concept provides an electronic device including: a display panel; and a first antenna disposed on the display panel and including a first patch part, a first transmission part, and a first additional transmission part, wherein the first transmission part faces a first side of the first patch part extending in a first cross direction, is spaced apart from the first patch part, and is capacitively coupled with the first patch part, and wherein the first additional transmission part faces another side (or second side) of the first patch part extending in a second cross direction crossing the first cross direction, is symmetrical about a line of symmetry with the first transmission part, and is spaced apart from the first patch part.

In an embodiment, the first antenna may be fed through at least any one of the first transmission part and the first additional transmission part.

In an embodiment, the other of the first transmission part and the first additional transmission part may be floated.

In an embodiment, the first antenna may be provided in plural, an interval between a center of a first patch part of one first antenna and a center of a first patch part of another first antenna, which is adjacent to the one first antenna, among a plurality of the first antennas may be about 0.5 to about 0.8 times of a reference wavelength.

In an embodiment, the first antenna may further include a first extension patch part spaced apart from the first patch part, and the first transmission part may extend toward the first extension patch part, face a first extension side extending in the first cross direction of the first extension patch part, be spaced apart from the first extension patch part, and be capacitively coupled to the first extension patch part.

In an embodiment, a size of the first extension patch part may be equal to or greater than that of the first patch part.

In an embodiment, the first antenna may further include a first additional extension patch part spaced apart from the first patch part with the first extension patch part interposed therebetween, wherein a size of the first additional extension patch part is equal to or greater than that of the first extension patch part, and the size of the first extension patch part is equal to or greater than that of the first patch part.

In an embodiment, the electronic device may further include a ground disposed under the display panel, wherein a distance between a center of the first patch part and a center of the first extension patch part is a guided wavelength derived by using an effective permittivity between the first antenna and the ground.

In an embodiment, the first transmission part may include a $\lambda/4$ transformer.

In an embodiment, the electronic device may further include a second antenna disposed on the display panel and including a second patch part and a second transmission part, wherein the second transmission part faces a second side of the second patch part extending in the second cross direction, is spaced apart from the second patch part, and is capacitively coupled to the second patch part.

In an embodiment, the second antenna may further include a second extension patch part spaced apart from the second patch part, and the second transmission part may extend toward the second extension patch part, face a second extension side extending in the second cross direction of the second extension patch part, be spaced apart from the second extension patch part, and be capacitively coupled to the second extension patch part.

In an embodiment, each of the first antenna and the second antenna may be provided in plural, wherein a plurality of the first antennas receive or output signals through a first common port, and a plurality of the second antennas receive or output signals through a second common port different from the first common port.

In an embodiment, the electronic device may further include: a first circuit film including the first common port and electrically connected to the plurality of first antennas; and a second circuit film including the second common port and electrically connected to the plurality of second antennas.

In an embodiment, the first cross direction may be orthogonal to the second cross direction, and the first transmission part and the second transmission part are symmetrical about a line of symmetry.

In an embodiment, the first transmission part may include a first transmission line and a first coupler extending from the first transmission line and facing the first side of the first patch part, and the second transmission part may include a second transmission line and a second coupler extending from the second transmission line and facing the second side of the second patch part, the first transmission line may be spaced apart from the second transmission line in a first direction, the first transmission line and the second transmission line may extend in parallel to a second direction crossing the first direction, the first coupler may include a first extension portion extending along the second cross direction and a first opposite portion extending along the first cross direction, and the second coupler may include a second extension portion extending from the second transmission line along the first cross direction and a second opposite portion extending along the second cross direction, wherein the first opposite portion faces the first side of the first patch part, and the second opposite portion faces the second side of the second patch part.

In an embodiment, the first antenna may be provided in plural, wherein a plurality of the first antennas receive or output signals respectively through a plurality of ports.

In an embodiment, the electronic device may further include a circuit film comprising the plurality of ports. The circuit film may include a dielectric layer, a conductive layer, and a plurality of transmission lines disposed on a first surface of the dielectric layer. The plurality of transmission lines may be electrically connected to the plurality of ports, respectively, and a length of the first transmission line among the plurality of transmission lines is longer than that of the second transmission line among the plurality of transmission lines.

In an embodiment, a difference between a length of the first transmission line and a length of the second transmission line may be an integer multiple of a guided wavelength derived by using a permittivity of the dielectric layer.

In an embodiment of the inventive concept, an electronic device includes: a display panel; and a first antenna disposed on the display panel and including a first patch part, a first extension patch part spaced apart from the first patch part, a first transmission part, and a first symmetric transmission part, the first transmission part and the first symmetric transmission part being symmetrical about a line of symmetry, wherein the first transmission part and the first symmetric transmission part are spaced apart in a first direction with the first patch part and the first extension patch part interposed therebetween, and the first extension patch part is spaced apart from the first patch part in a second direction crossing the first direction.

In an embodiment, the first transmission part may include a first λ/4 transformer adjacent to an output stage facing the first patch part, and a second λ/4 transformer adjacent to an output stage facing the first extension patch part.

In an embodiment, the electronic device may further include a second antenna disposed on the display panel and including a second patch part, a second extension patch part spaced apart from the second patch part, and a second transmission part, and a second symmetric transmission part, wherein the second transmission part and the second symmetric transmission part are spaced apart in the first direction with the second patch part and the second extension patch part interposed therebetween, the second extension patch part is spaced apart from the second patch part in the second direction, the second transmission part and the first transmission part are symmetrical about a line of symmetry extending in the second direction, and the second symmetric transmission part has a same shape as the first transmission part.

In an embodiment, the first patch part may receive a signal through the first transmission part, the second patch part may receive a signal through the second transmission part, and the first symmetric transmission part and the second symmetric transmission part may be floated.

In an embodiment, the electronic device may further include a circuit film including a dielectric layer, a conductive layer disposed on a first surface of the dielectric layer, the conductive layer including a plurality of transmission lines, wherein the first antenna is provided in plural, wherein a plurality of the first antennas receive respective signals through the plurality of transmission lines, a length of a first transmission line among the plurality of transmission lines is longer than that of a second transmission line among the plurality of transmission lines, and a difference between the lengths of the first transmission line and the second transmission line is an integer multiple of a guided wavelength derived by using a permittivity of the dielectric layer.

In an embodiment, a size of the first extension patch part may be equal to or greater than that of the first patch part.

In an embodiment, the first antenna may further include a first additional extension patch part spaced apart from the first patch part with the first extension patch part interposed therebetween, wherein a size of the first additional extension patch part is equal to or greater than that of the first extension patch part, and the size of the first extension patch part is equal to or greater than that of the first patch part.

BRIEF DESCRIPTION OF THE DRAWINGS

The accompanying drawings are included to provide a further understanding of the inventive concept and are incorporated in and constitute a part of this specification. The drawings illustrate embodiments of the inventive concept and, together with the description, serve to explain principles of the inventive concept. In the drawings.

DETAILED DESCRIPTION

Figure 1:
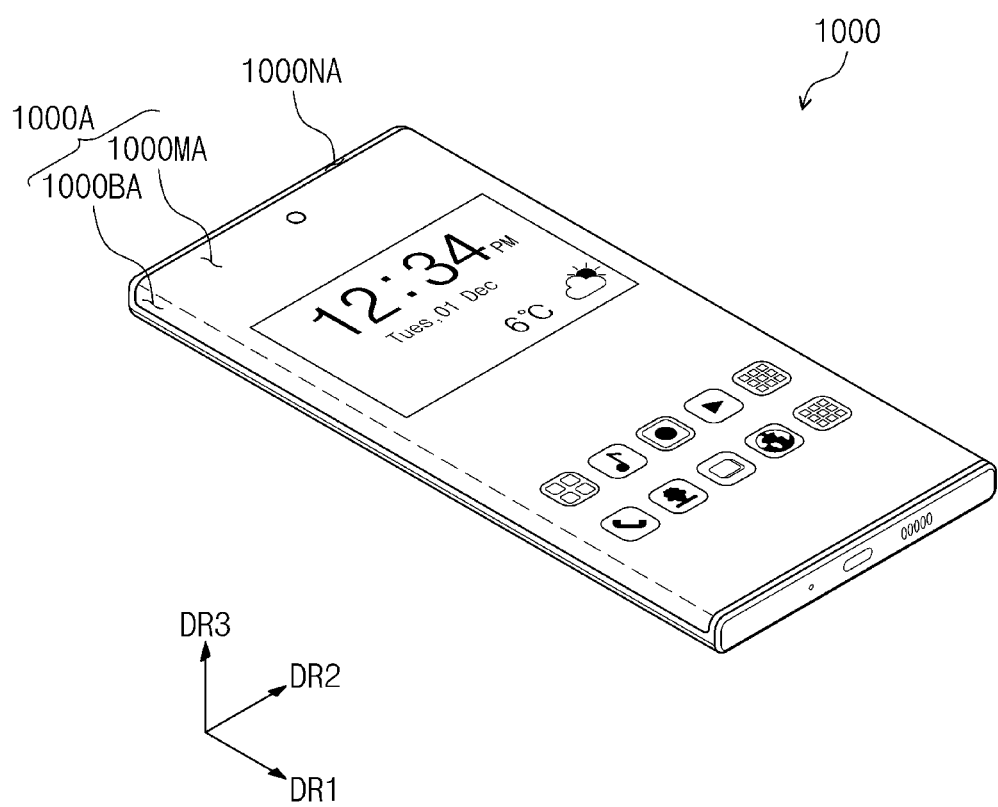
FIG. 1 is a perspective view of an electronic device according to an embodiment of the inventive concept.

It will be understood that when an element or layer is referred to as being "on", "connected to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents. The term "and/or" includes any and all combinations of one or more of the associated items.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure. The singular expressions include plural expressions unless the context clearly dictates otherwise.

In addition, the terms such as "under", "lower", "on", and "upper" are used for explaining associations of items illustrated in the drawings. The terms are described relative to the direction shown in the drawings in a relative concept.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings.

FIG. 1 is a perspective view of an electronic device according to an embodiment of the inventive concept.

Referring to FIG. 1, the electronic device 1000 may be activated is response to an electrical signal. For example, the electronic device 1000 may be a mobile phone, a tablet PC, a vehicle navigation system, a game device, or a wearable device, but is not limited thereto. In FIG. 1, the display device 1000 is illustrated as a mobile phone, for example.

A display area 1000A and a non-display area 1000NA may be defined in the electronic device 1000. The non-display area 1000NA may surround the display area 1000A.

The electronic device 1000 may display an image through the display area 1000A. The display area 1000A may include a first display surface 1000MA, which is parallel to a surface defined by a first direction DR1 and a second direction DR2, and a second display surface 1000BA bent from the first display surface 1000MA.

The second display surface 1000BA may be provided to be bent from one side of the first display surface 1000MA. Alternatively, the second display surface 1000BA may be provided in plural. In this case, the second display surfaces 1000BA may be provided to be bent from at least two sides of the first display surface 1000MA. The display area 1000A may include one first display surface 1000MA and one to four second surfaces 1000BA. However, the shape of the display area 1000A is not limited thereto, and the display area 1000A may also include only the first display surface 1000MA.

The thickness direction of the display device 1000 may be parallel to a third direction DR3 that crosses the first direction DR1 and the second direction DR2. Accordingly, the front surfaces (or top surfaces) and the rear surfaces (or bottom surfaces) of constituents provided in the display device 1000 may be defined on the basis of the third direction DR3. "When viewed in a plan view" may be defined as being viewed from the third direction DR3 of the electronic device 1000.

Figure 2A:
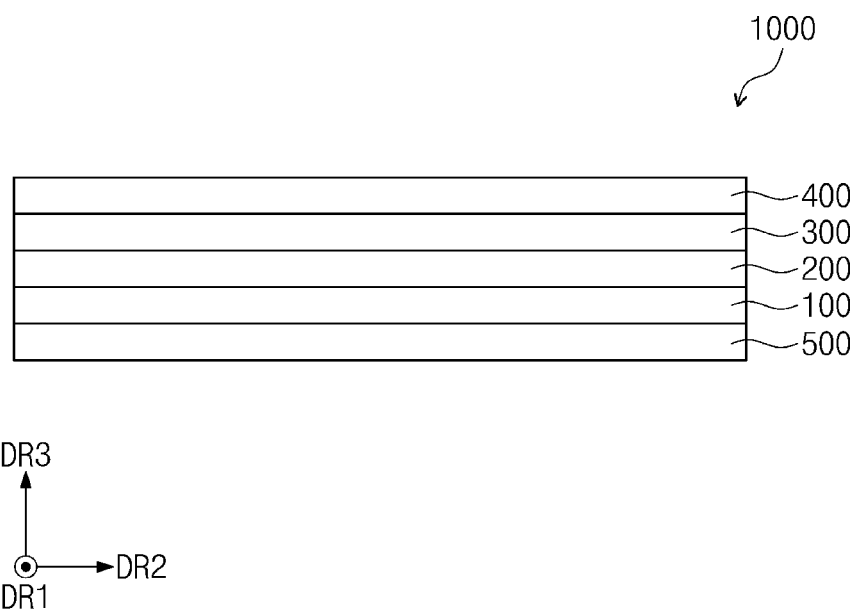
FIG. 2A is a schematic cross-sectional diagram of an electronic device according to the inventive concept.

FIG. 2A is a schematic cross-sectional diagram of an electronic device according to the inventive concept.

Referring FIG. 2A, the electronic device 1000 may include a display panel 100, an optical film 200, an antenna layer 300, a window 400, and a bottom layer 500. In an embodiment of the inventive concept, some of the aforementioned components may be omitted or other components may be further added. An adhesive layer may be disposed between the constituents as necessary. The adhesive layer may be an Optically Clear Adhesive (OCA), or a Pressure Sensitive Adhesive (PSA) film, but the adhesive layer is not particularly limited thereto. Adhesive layers to be described below may also include the same material as the adhesive layer described above or a typical adhesive.

The display panel 100 may display an image and sense an input applied externally. For example, the display panel 100 may include a display layer and a sensor layer disposed on the display layer.

The optical film 200 may lower the reflectance of the light incident from outside. The optical film 200 may include a retarder and/or a polarizer. The optical film 200 may include at least a polarization film. In this case, the optical film 200 may be attached to the display panel 100 through the adhesive layer.

Alternatively, the optical film 200 may include color filters. In this case, the adhesive layer between the optical film 200 and the display panel 100 may be omitted. The color filters may have a prescribed array. The array of the color filters may be determined in consideration of light emission colors of pixels included in the display panel 100. In addition, the optical film 200 may further include a black matrix disposed adjacent to the color filters.

Alternatively, the optical film 200 may include a destructive interference structure. For example, the destructive interference structure may include a first reflection layer and a second reflection layer disposed on different layers. First reflection light and second reflection light respectively reflected by the first reflection layer and the second reflection layer may destructively interfere with each other, and accordingly an external light reflectance may be reduced. In this case, the adhesive layer between the optical film 200 and the display panel 100 may be omitted.

The antenna layer 300 may be disposed on the optical film 200. The antenna layer 300 may be a film type antenna. The antenna layer 300 may include an antenna configured to transmit, receive, or transmit and receive a radio communication signal, for example, a radio frequency signal. The antenna layer 300 may be referred to as a radio frequency device layer. The antenna layer 300 may include a plurality of antennas, and the plurality of antennas may transmit, receive, or transmit and receive the same frequency band, or different frequency bands. The antenna layer 300 may be attached to the optical film 200 through the adhesive layer. A detailed description about the antenna layer 300 may be provided later.

The window 400 may be disposed on the antenna layer 300. The window 400 may include an insulation material that is optically transparent. For example, the window 400 may include glass or plastic. The window 400 may have a multilayer structure or a single-layer structure. For example, the window 400 may include a plurality of plastic films bonded with an adhesive, or a glass substrate and a plastic film bonded with an adhesive.

The bottom layer 500 may be disposed under the display panel 100. The bottom layer 500 may be a conductive plate containing copper or a copper alloy. Other components such as a cushion layer, or a protection film may be further disposed between the bottom layer 500 and the display panel 100. The bottom layer 500 may serve as a grounding function for the antenna layer 300 and may be referred to as the ground, a ground member, or a ground layer.

Figure 2B:
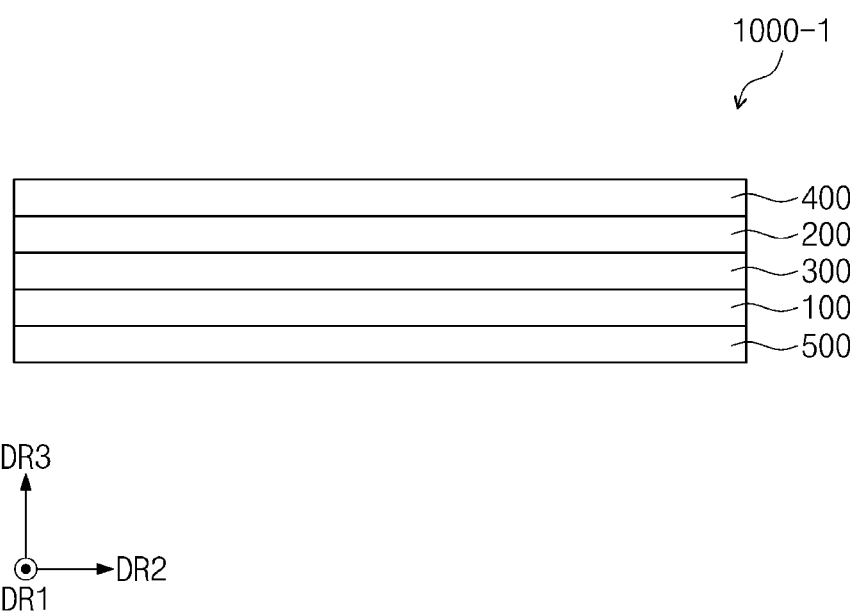
FIG. 2B is a schematic cross-sectional diagram of an electronic device according to an embodiment of the inventive concept.

FIG. 2B is a schematic cross-sectional diagram of an electronic device according to an embodiment of the inventive concept.

In comparison with FIG. 2A, an electronic device 1000-1 shown in FIG. 2B has a difference in position of the antenna layer 300 included in the electronic device 1000-1. Referring to FIG. 2B, the antenna layer 300 may be disposed between the optical film 200 and the display panel 100.

In one embodiment, a transparent compensation film for increasing the distance between the antenna layer 300 and the display panel 100 may be further disposed between the antenna layer 300 and the display panel 100.

In addition, in FIGS. 2A and 2B, the antenna layer 300 is described to be provided to the outside of the display panel 100, but the location of the antenna layer 300 is not limited thereto. For example, the antenna layer 300 may be embedded in the display panel 100.

Figure 3A:
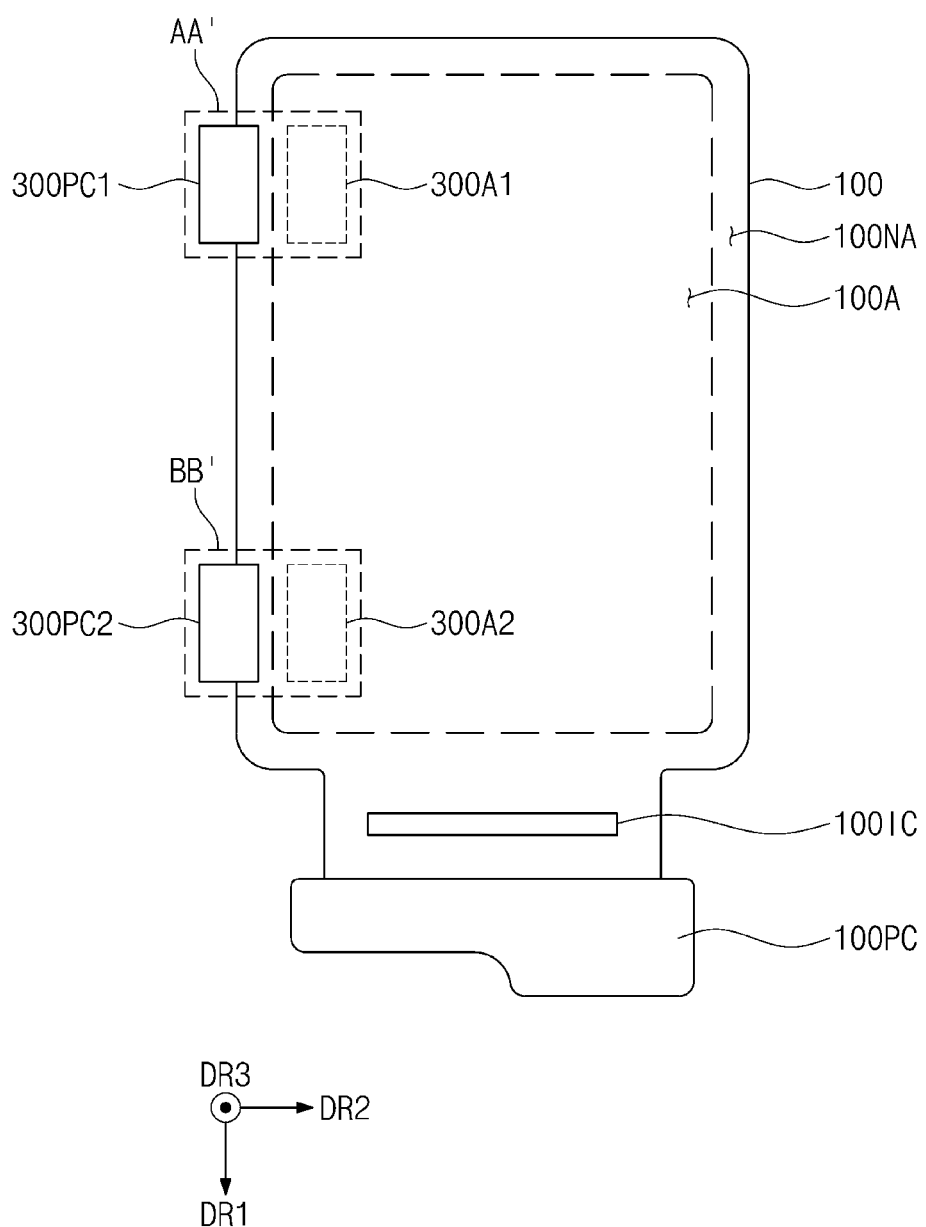
FIG. 3A is a plan view of a display panel and a plurality of circuit films according to an embodiment of the inventive concept.

FIG. 3A is a plan view of a display panel and a plurality of circuit films according to an embodiment of the inventive concept.

Referring to FIG. 3A, the display panel 100 may include an active area 100A and a surrounding area 100NA. The active area 100A may be activated in response to an electrical signal. In the surrounding area 100NA, a driving circuit or driving lines for driving the active area 100A may be disposed.

A driving chip 100IC for driving the display panel 100 may be mounted on the surrounding area 100NA of the display panel 100. In addition, the surrounding area 100NA of the display panel 100 may be connected to a circuit board 100PC configured to provide signals to the driving chip 100IC and the display panel 100. However, this is only an example, and the driving chip 100IC may be mounted on the circuit board 100PC.

Antennas included in the antenna layer 300 (see FIG. 2A) may be disposed in a first antenna area 300A1 and a second antenna area 300A2. The first antenna area 300A1 and the second antenna area 300A2 may overlap the active area 100A. For example, the first antenna area 300A1 and the second antenna area 300A2 may overlap a left portion of the active area 100A.

The first antenna area 300A1 and the second antenna area 300A2 may be spaced apart from each other in the first direction DR1. In FIG. 3A, the two first and second antenna areas 300A1 and 300A2 are illustrated as an example, but the configuration of the antenna areas are not limited thereto. For example, one antenna area may be provided, or three or more antenna areas may be provided.

The antennas disposed in the first antenna area 300A1 may be electrically connected to a first circuit film 300PC1 and the antennas disposed in the second antenna area 300A2 may be electrically connected to the second circuit film 300PC2. The first circuit film 300PC1 and the second circuit film 300PC2 may be connected to a portion of the antenna layer 300 (see FIG. 3A) that overlaps the surrounding area 100NA of the display panel 100. The first circuit film 300PC1 and the second circuit film 300PC2 may overlap the respective long sides of the display panel 100 which extend along the first direction DR1. Each of the first circuit film 300PC1 and the second circuit film 300PC2 may be a flexible printed circuit film.

In FIG. 3A, as an example, the first circuit film 300PC1 and the second circuit film 300PC2 are illustrated as being respectively connected to the first and second antenna areas 300A1 and 300A2, but the configuration of the first circuit film 300PC1 and the second circuit film 300PC2 are not limited thereto. In one embodiment, the antennas disposed in the first antenna area 300A1 and the antennas disposed in the second antenna area 300A2 may be connected to one circuit film.

The first and second circuit films 300PC1 and 300PC2 may be electrically connected to the antennas through a conductive adhesive film. For example, the conductive adhesive film may be an Anisotropic Conductive Film (ACF).

In an embodiment of the inventive concept, the first and second circuit films 300PC1 and 300PC2 may be omitted. For example, an extended portion of the display panel 100 may replace the first and second circuit films 300PC1 and 300PC2. In this case, the extended portion of the display panel 100 may bend toward the rear surface of the display panel 100.

Figure 3B:
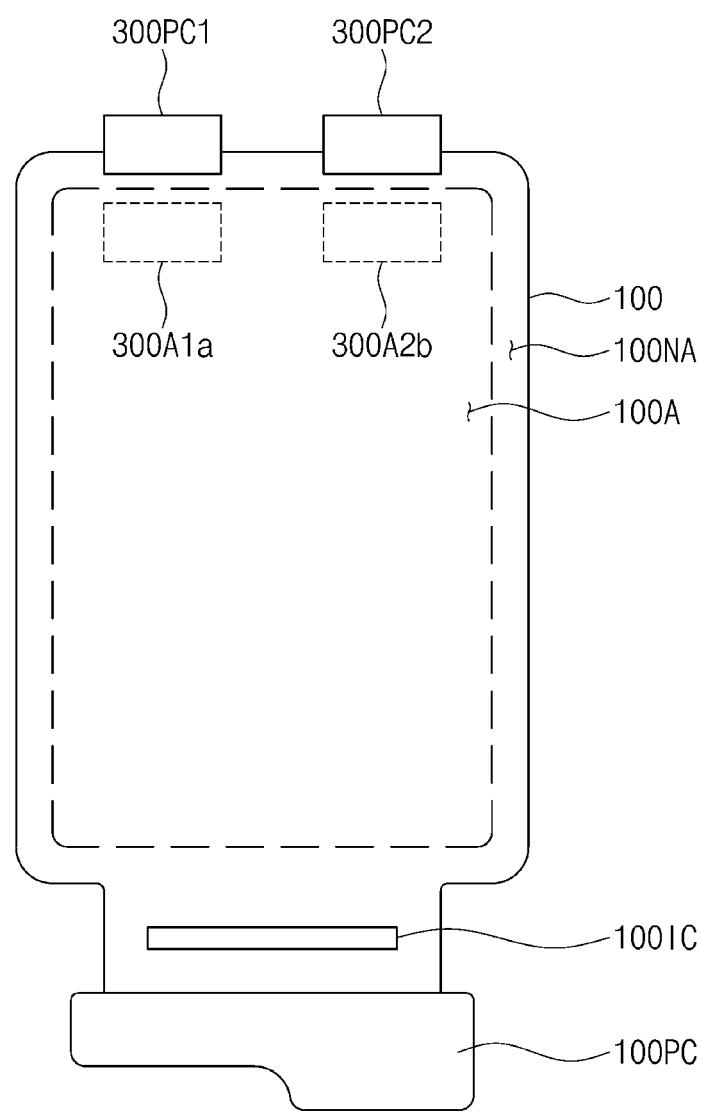
FIG. 3B is a plan view illustrating a display panel and a plurality of circuit films according to an embodiment of the inventive concept.

FIG. 3B is a plan view illustrating a display panel and a plurality of circuit films according to an embodiment of the inventive concept.

Referring to FIG. 3B, antennas included in the antenna layer 300 (see FIG. 2A) may be disposed in an first antenna area 300A1a and an second antenna area 300A2b. The first antenna area 300A1a and the second antenna area 300A2b may overlap the active area 100A. For example, the first antenna area 300A1a and the second antenna area 300A2b may overlap an upper portion of the active area 100A.

The antennas disposed in the first antenna area 300A1a may be electrically connected to a first circuit film 300PC1 and the antennas disposed in the second antenna area 300A2b may be electrically connected to the second circuit film 300PC2. The first circuit film 300PC1 and the second circuit film 300PC2 may be connected to a portion of the antenna layer 300 (see FIG. 3A) that overlaps the surrounding area 100NA of the display panel 100. The first and second circuit films 300PC1 and 300PC2 may overlap the respective short sides of the display panel 100 which extend along the second direction DR2.

Figure 3C:
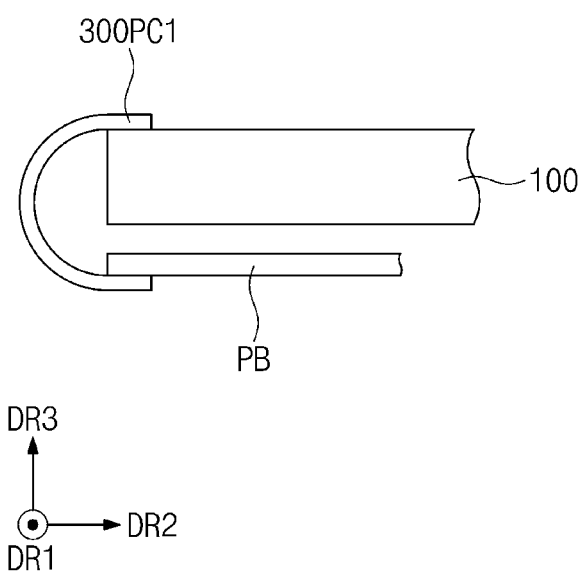
FIG. 3C is a schematic cross-sectional diagram of an electronic device according to an embodiment of the present inventive concept.

FIG. 3C is a schematic cross-sectional diagram of an electronic device according to an embodiment of the present inventive concept.

Referring to FIG. 3C, the display panel 100, the first circuit film 300PC1 and a printed circuit board PB connected to the first circuit film 300PC1 is illustrated as an example. The first circuit film 300PC1 bends towards the rear surface of the display panel 100 to be electrically connected to the printed circuit board PB.

The printed circuit board PB may be mounted with a communication circuit for transmitting and receiving a radio signal. The communication circuit may include one chip package or a plurality of chip packages. The antennas may transmit and receive a signal through the first circuit film 300PC1.

In addition, in another embodiment of the inventive concept, the printed circuit board PB may be provided in plural. In this case, a plurality of the printed circuit boards may be connected through a connector or a circuit film.

Figure 4A:
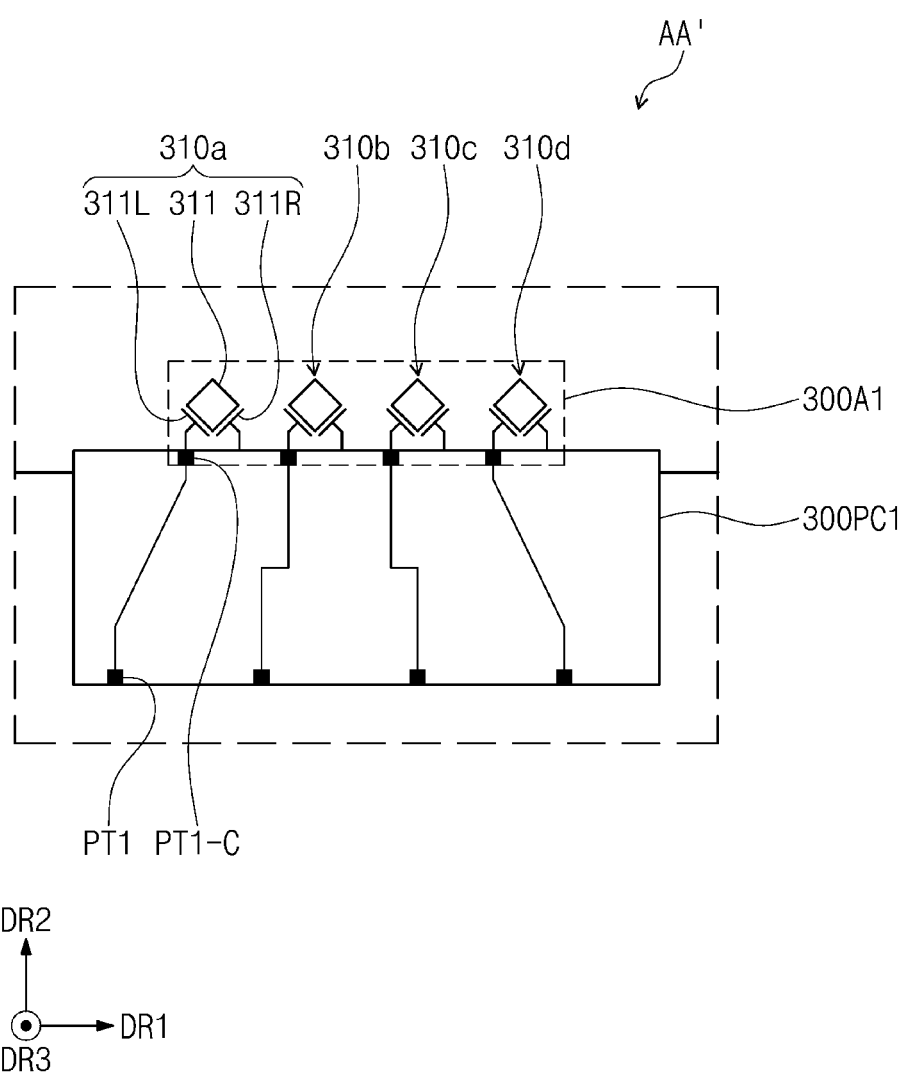
FIG. 4A is a plan view illustrating an area corresponding to area AA' shown in FIG. 3A.
Figure 4B:
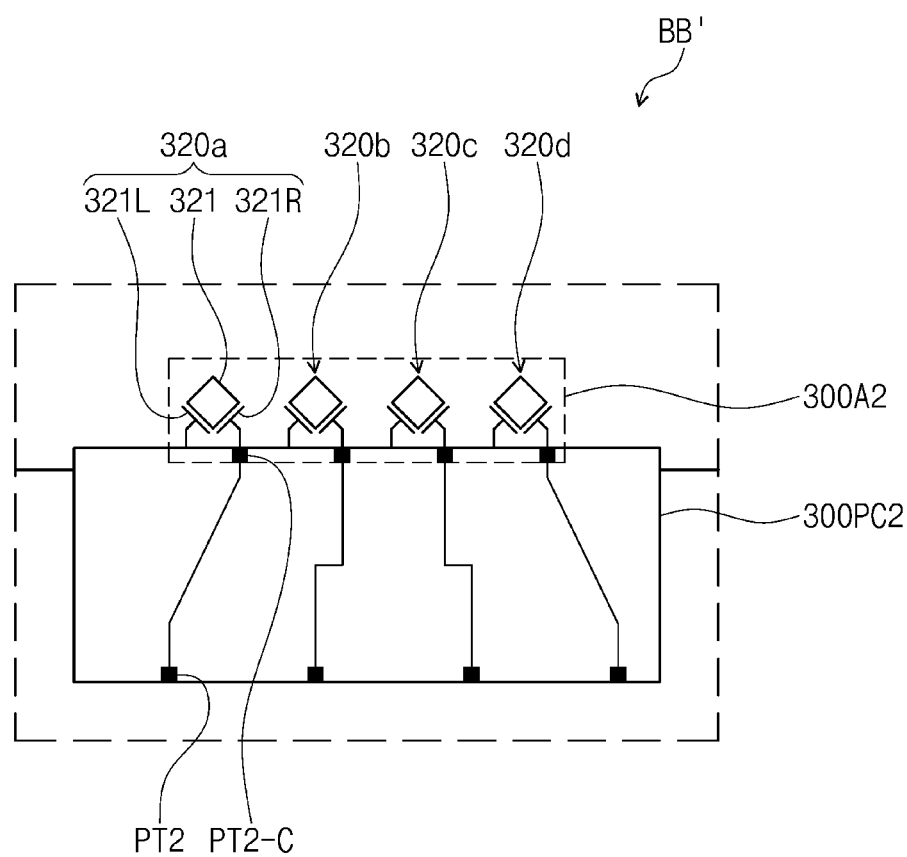
FIG. 4B is a plan view illustrating an area corresponding to area BB' shown in FIG. 3A.

FIG. 4A is a plan view illustrating an area corresponding to area AA' shown in FIG. 3A. FIG. 4B is a plan view illustrating an area corresponding to area BB' shown in FIG. 3A.

Referring to FIGS. 4A and 4B, the antenna layer 300 (see FIG. 2A) may include a plurality of first antennas 310a, 310b, 310c and 310d and a plurality of second antennas 320a, 320b, 320c and 320d. The first antennas 310a, 310b, 310c and 310d may be disposed in the first antenna area 300A1, and the second antennas 320a, 320b, 320c and 320d may be disposed in the second antenna area 300A2.

In FIGS. 4A and 4B, the four first antennas 310a, 310b, 310c and 310d, and the four second antennas 320a, 320b, 320c and 320d are illustrated as an example, but the numbers thereof are not limited thereto. For example, the antenna layer 300 (see FIG. 2A) may include only one first antenna and one second antenna, or may include two or more first antennas and two or more second antennas.

The shape of each of the first antennas 310a, 310b, 310c and 310d may be the same. Accordingly, a description will be provided for one first antenna 310a. The first antenna 310a may include a first patch part 311, a first transmission part 311L, and a first symmetric transmission part 311R. The first transmission part 311L and the first symmetric transmission part 311R may be spaced apart from the first patch part 311. The first transmission part 311L may be capacitively coupled with the first patch part 311. The first transmission part 311L may have a symmetric shape to the first symmetric transmission part 311R. The first transmission part 311L may be linearly symmetric to the first symmetric transmission part 311R with respect to a line of symmetry extending along the second direction DR2. The first patch part 311 may be referred to as a first patch, or a first patch pattern. The first transmission part 311L may be referred to as a first transmission pattern or a first transmission line. The first symmetric transmission part 311R may be referred to as a first symmetric transmission pattern or a first symmetric transmission line.

The first antennas 310a, 310b, 310c, and 310d may receive or provide signals through the first circuit film 300PC1. The first circuit film 300PC1 may include first ports PT1 and first opposite ports PT1-C. Signals provided through the first ports PT1 may be delivered to the first opposite ports PT1-C, and signals provided through the first opposite ports PT1-C may be provided to the first ports PT1. The numbers of the first ports PT1 and the first opposite ports PT1-C may be the same, and the number of the first ports PT1 may be the same as that of the first antennas 310a, 310b, 310c, and 310d. One first port PT1 may be connected to one first opposite port PT1-C.

The first opposite ports PT1-C may be connected to the first transmission parts 311L of the first antennas 310a, 310b, 310c, and 310d, respectively. The first patch part 311 may be capacitively coupled to the first transmission part 311L and receive a signal therethrough. A capacitance may be generated between the first patch part 311 and the first transmission part 311L. In this case, the antenna reactance may gradually change according to frequency. As a result, the fractional bandwidth may further increase in a case where the first patch part 311 is capacitively coupled with the first transmission part 311L than a case where the first patch part 311 is directly connected to the first transmission part 311L.

The shape of each of the second antennas 320a, 320b, 320c, and 320d may be the same. Accordingly, a description will be provided for one second antenna 320a. The second antenna 320a may include a second patch part 321, the second transmission part 321R, and a second symmetric transmission part 321L. The second transmission part 321R and the second symmetric transmission part 321L may be spaced apart from the second patch part 321. The second transmission part 321R may be capacitively coupled with the second patch part 321.

The second transmission part 321R may have a symmetric shape to the second symmetric transmission part 321L. The second transmission part 321R may be linearly symmetric to the second symmetric transmission part 321L with respect to a line of symmetry extending along the second direction DR2. The second transmission part 321R may have the same shape as the first symmetric transmission part 311R.

The second antennas 320a, 320b, 320c, and 320d may receive signals through the second circuit film 3000PC2. The second circuit film 300PC2 may include second ports PT2 and second opposite ports PT2-C. The numbers of the second ports PT2 and the second opposite ports PT2-C may be the same, and the number of the second ports PT2 may be the same as that of the second antennas 320a, 320b, 320c, and 320d. One second port PT2 may be connected to one second opposite port PT2-C.

The second opposite ports PT2-C may be connected to the second transmission parts 321R of the second antennas 320a, 320b, 320c, and 320d, respectively. The second patch part 321 may be capacitively coupled to the second transmission part 321R and receive a signal therethrough. A capacitance may be generated between the second patch part 321 and the second transmission part 321R. In this case, the antenna reactance may gradually change according to frequency. As the result, a fractional bandwidth may further increase in a case where the second patch part 321 is capacitively coupled with the second transmission part 321R than a case where the second patch part 321 is directly connected to the second transmission part 321R.

The first antennas 310*a*, 310*b*, 310*c*, 310*d* may receive signals (or energy) through the respective first transmission parts 311L of the first antennas 310*a*, 310*b*, 310*c*, and 310*d*. The second antennas 320*a*, 320*b*, 320*c*, 320*d* may receive signals (or energy) through the respective second transmission parts 321R of the first antennas 320*a*, 320*b*, 320*c*, and 320*d*.

The first antennas 310*a*, 310*b*, 310*c*, 310*d* may generate first polarization characteristics in response to signals provided from the first transmission parts 311L. When the first antennas 310*a*, 310*b*, 310*c*, and 310*d* generating the first polarization characteristics are arrayed in plural, the antenna gain may increase in first polarization. The second antennas 320*a*, 320*b*, 320*c*, 320*d* may generate second polarization characteristics in response to signals provided from the second transmission parts 321R. When the second antennas 320*a*, 320*b*, 320*c*, and 320*d* generating the second polarization characteristics are arrayed in plural, the antenna gain may increase in second polarization.

The first and second polarization characteristics may be different from each other. In addition, since the signals are received by the first antennas 310*a*, 310*b*, 310*c*, and 310*d* and the second antennas 320*a*, 320*b*, 320*c*, and 320*d*, a diversity scheme may be used in which signals having the best characteristics are selected from among the received signals.

The first antennas 310*a*, 310*b*, 310*c*, and 310*d*, and the second antennas 320*a*, 320*b*, 320*c*, and 320*d* receive signals through the first ports PT1 and the second ports PT2 that are spaced apart from each other. In this case, a Radio Frequency Integrated Circuit (RFIC) may provide signals having different phases and/or amplitudes to the first ports PT1 and the second ports PT2. Accordingly, each of the first antennas 310*a*, 310*b*, 310*c*, and 310*d*, and the second antennas 320*a*, 320*b*, 320*c*, and 320*d* may be controlled to strongly transmit and receive a signal in a specific direction. In other words, each of the first antennas 310*a*, 310*b*, 310*c*, and 310*d* and the second antennas 320*a*, 320*b*, 320*c*, and 320*d* may operate as a beam-forming antenna. The RFIC may be mounted on the printed circuit board PB shown in FIG. 3C.

The first symmetric transmission part 311R and the second symmetric transmission part 321L may not be provided with a signal. For example, the first symmetric transmission part 311R and the second symmetric transmission part 321L may be electrically floated. The first symmetric transmission part 311R and the second symmetric transmission part 321L may be respectively referred to as a first dummy transmission part and a second dummy transmission part. In an embodiment of the inventive concept, the first symmetric transmission part 311R and the second symmetric transmission part 321L may be omitted.

Figure 5A:
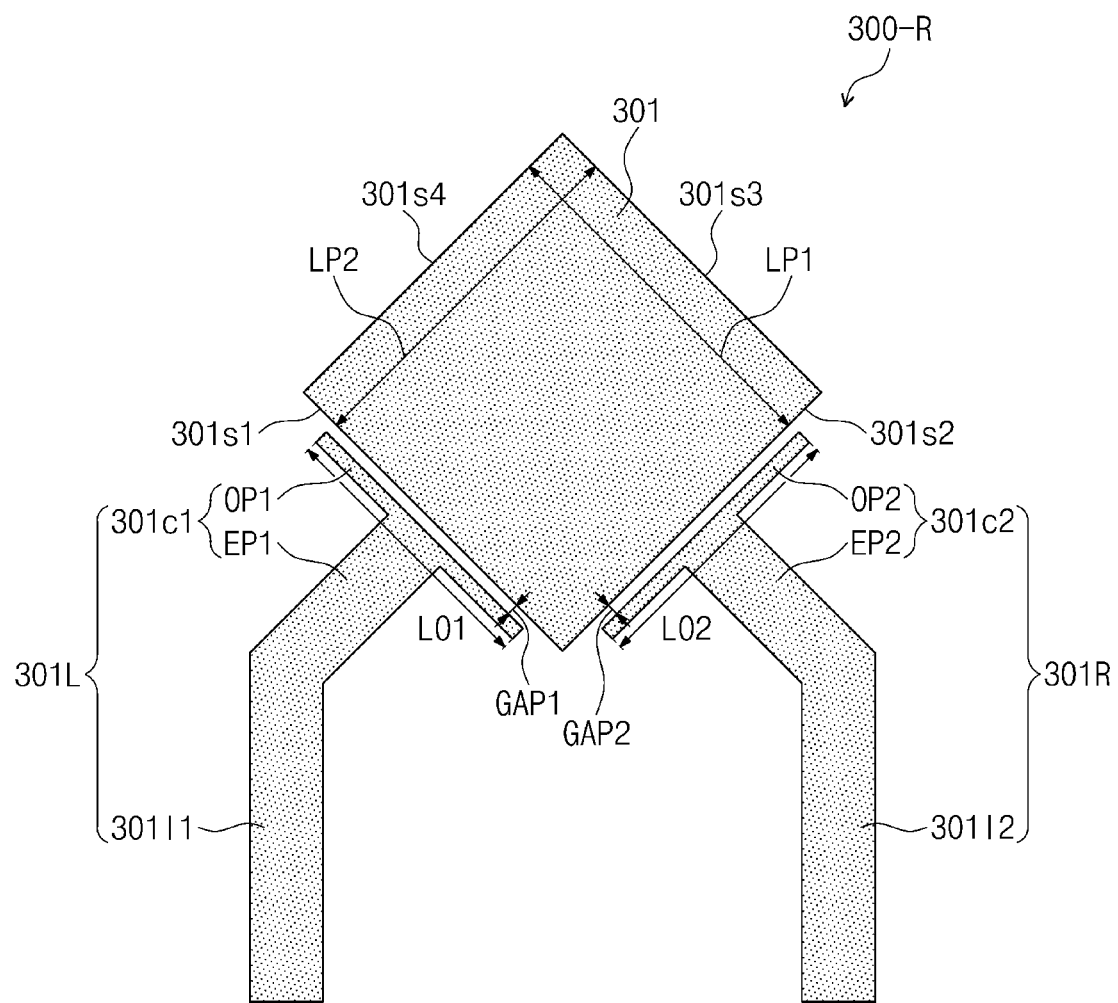
FIG. 5A is a plan view of an antenna according to an embodiment of the inventive concept.

FIG. 5A is a plan view of an antenna according to an embodiment of the inventive concept.

Referring to FIG. 5A, an antenna 300-R may include a patch part 301, a first side transmission part 301L, and a second side transmission part 301R. Each of the first antennas 310*a*, 310*b*, 310*c*, and 310*d* and the second antennas 320*a*, 320*b*, 320*c*, and 320*d* described with reference to FIGS. 4A and 4B may have the same shape as the antenna 300-R shown in FIG. 5A. The patch part 301 may correspond to each of the first patch part 311 (see FIG. 4A) and the second patch part 321 (see FIG. 4B). The first side transmission part 301L may correspond to each of the first transmission part 311L (see FIG. 4A) and the second symmetric transmission part 321L (see FIG. 4B). The second side transmission part 301R may correspond to each of the first symmetric transmission part 311R (see FIG. 4A) and the second transmission part 321R (see FIG. 4B).

The patch part (301), the first side transmission part 301L, and the second side transmission part 301R may be disposed on the same layer. The patch part (301), the first side transmission part 301L, and the second side transmission part 301R illustrated in FIG. 5A may have electrode types in which openings are not defined. In this case, the patch part (301), the first side transmission part 301L, and the second side transmission part 301R may contain a transparent conductive material.

The patch part 301 may have a rectangular shape, and have a first side 301*s*1, a second side 301*s*2, a third side 301*s*3, and a fourth side 301*s*4. The first side 301*s*1 and the third side 301*s*3 may face each other and be spaced apart from each other in a first cross direction DRC1. The second side 301*s*2 and the fourth side 301*s*4 may face each other and be spaced from each other in a second cross direction DRC2.

Each of the first side 301*s*1 and the third side 301*s*3 extends in a parallel direction to the second cross direction DRC2, and each of the second side 301*s*2 and the fourth side 301*s*4 extends in a parallel direction to the first cross direction DRC1. The first side 301*s*1 may be connected to the second side 301*s*2 and the fourth side 301*s*4, and the third side 301*s*2 may be connected to the second side 301*s*2 and the fourth side 301*s*4. The first cross direction DRC1 may be a direction between the first direction DR1 and the second direction DR2, and the second cross direction DRC2 may be a direction orthogonal to the first cross direction DRC1.

The first side 301*s*1 and the third side 301*s*3 may have the same first length LP1. The first length LP1 may correspond to the width of the patch part 301 in a direction parallel to the second cross direction DRC2. The second side 301*s*2 and the fourth side 301*s*4 may have the same second length LP2. The second length LP2 may correspond to the width of the patch part 301 in a direction parallel to the first cross direction DRC1.

The first length LP1 and the second length LP2 may be the same. For example, the first length LP1 and the second length LP2 may be 3.05 mm, but the first length LP1 and the second length LP2 are not particularly limited thereto. Since the first length LP1 and the second length LP2 are the same, the patch part 301 may have a square shape or a rhombus shape.

The first side transmission part 301L may face the first side 301*s*1. The first side transmission part 301L may be spaced from the first side 301*s*1 with a prescribed gap GAP1 interposed therebetween. The first side transmission part 301L and the patch part 301 may not be directly connected. The first side transmission part 301L may be capacitively coupled with the patch part 301.

The second side transmission part 301R may face the second side 301*s*2. The second side transmission part 301R may be spaced from the second side 301*s*2 with a prescribed gap GAP2 interposed therebetween. The second side transmission part 301R and the patch part 301 may not be directly connected. The second side transmission part 301R may be capacitively coupled with the patch part 301.

One patch part 301 may receive a signal or energy from the first side transmission part 301L or the second side transmission part 301R. For example, some antennas may receive or deliver signals or energy through the first side transmission part 301L, and provide first polarization characteristics. The other antennas may receive or deliver signals or energy through the second side transmission part 301R, and provide second polarization characteristics that are different from the first polarization characteristics.

Alternatively, one patch part (301) may receive signals or energy from the two first and second side transmission parts 301L and 301R. The one patch part 301 may provide two polarization characteristics. For example, the one patch part 301 may provide first polarization characteristics in response to a signal provided from the first side transmission part 301L, and the one patch part 301 may provide second polarization characteristics in response to a signal provided from the second side transmission part 301R.

The first side transmission part 301L may include a first transmission line 30111 and a first coupler 301c1 extending from the first transmission line 30111 and facing the first side 301s1. The second side transmission part 301R may include a second transmission line 30112 and a second coupler 301c2 extending from the second transmission line 30112 and facing the second side 301s2.

The first transmission part 301L and the second transmission part 301R may be spaced apart in the first direction DR1. A portion of the patch part 301 may be disposed between a portion of the first sided transmission part 301L and a portion of the second side transmission part 301R. The first side transmission part 301L and the second side transmission part 301R may have the shapes symmetric to each other. The first transmission part 301L and the second transmission part 301R may be symmetrical about a line of symmetry extending along the second direction DR2.

The first transmission line 30111 and the second transmission line 30112 are spaced apart in the first direction DR1, and each of the first transmission line 30111 and the second transmission line 30112 may extend in parallel to the second direction DR2 crossing the first direction DR1.

The first coupler 301c1 may include a first extension portion EP1 extending along the first cross direction DRC1 from the first transmission line 30111 and a first opposite portion OP1 extending along the second cross direction DRC2 crossing the first cross direction DRC1. The second coupler 301c2 may include a second extension portion EP2 extending along the second cross direction DRC2 from the second transmission line 30112 and a second opposite portion OP2 extending along the first cross direction DRC1. An angle formed by the first opposite portion OP1 and the second opposite portion OP2 may be 90 degrees.

The first extension portion EP1 may be connected to a center area of the first opposite portion OP1 and the second extension portion EP2 may be connected to a center area of the second opposite portion OP2. Accordingly, each of the first coupler 301c1 and the second coupler 301c2 may have a "T" shape. The first coupler 301c1 and the second coupler 301c2 may be respectively referred to as a first T coupler and a second T coupler. The first coupler 301c1 and the second coupler 301c2 may be respectively referred to as a first resonator and a second resonator.

Each of the first coupler 301c1 and the second coupler 301c2 may be coupled (or capacitively coupled) to the patch part 301 to deliver energy to the patch part 301. The length LO1 of the first opposite portion OP1, the length LO2 of the second opposite portion OP2, the gap GAP1 between the first opposite portion OP1 and the patch part 301, and the gap GAP2 between the second opposite portion OP2 and the patch part 301 may be design variables. For example, each of the length LO1 and the length LO2 may be about 2.3 mm, and each of the gap GAP1 and the gap GAP2 may be about 20 µm, but they are not limited thereto. The length LO1 of the first opposite portion OP1 may be shorter than the first length LP1 of the patch part 301 and the length LO2 of the second opposite portion OP2 may be shorter than the second length LP2 of the patch part 301.

Figure 5B:
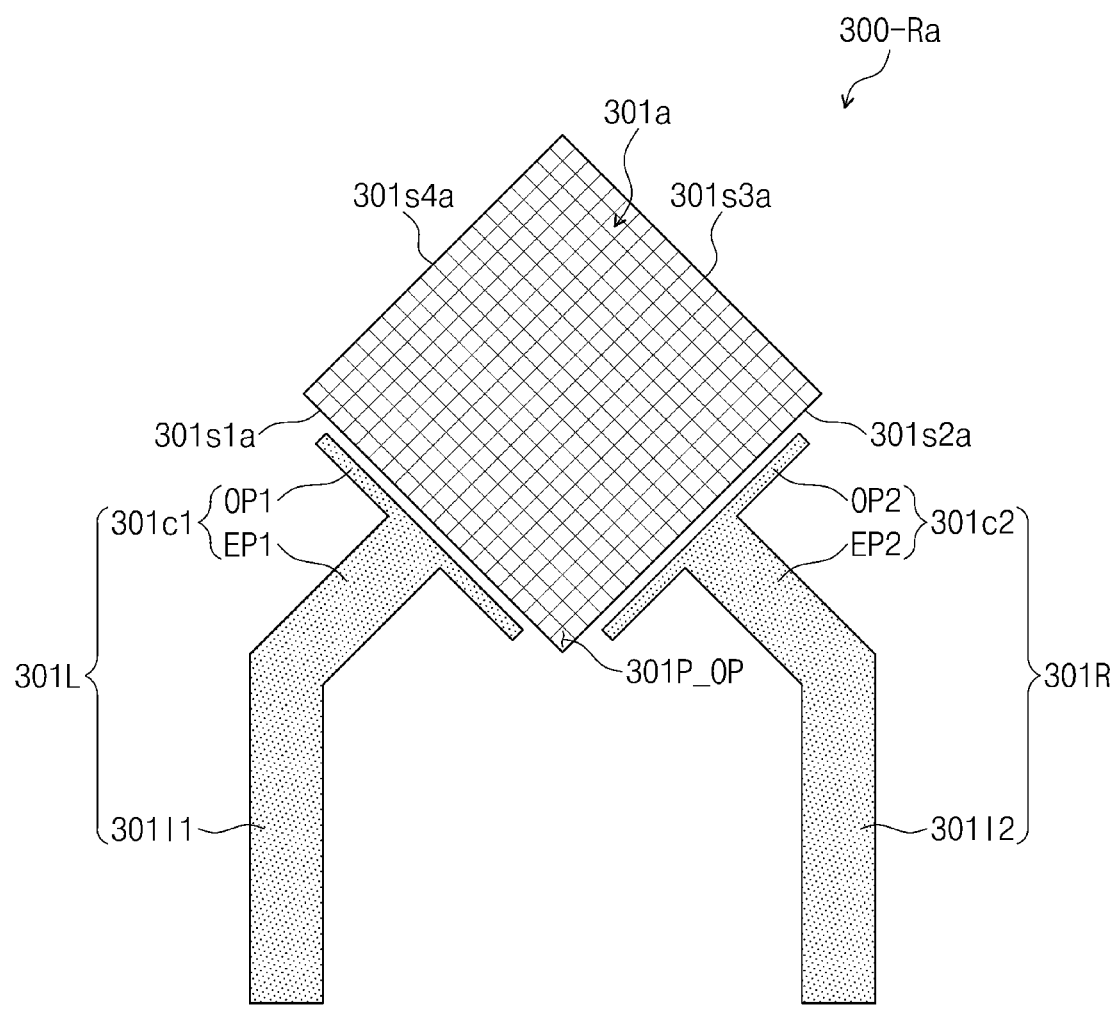
FIG. 5B is a plan view of an antenna according to an embodiment of the inventive concept.

FIG. 5B is a plan view of an antenna according to an embodiment of the inventive concept. In description about FIG. 5B, like reference numerals are given to like elements described in FIG. 5A, and the descriptions thereabout will be omitted.

Referring to FIG. 5B, an antenna 300-Ra may include a patch part 301a, the first side transmission part 301L, and the second side transmission part 301R. The patch part 301a may have a mesh structure in which a plurality of openings 301P_OP are defined. The plurality of openings 301P_OP may overlap a light emission area of the display panel 100 (see FIG. 2A).

Even though the mesh lines provided in the patch part 301a contain an opaque material, since the plurality of openings 301P_OP are defined in the patch part 301a, the transparency of the patch part 301a may increase. Therefore, even though the patch part 301a is disposed to overlap the active area 100A (see FIG. 3A), an image displayed through the active area 100A may not be blocked. The width of each of the mesh lines may be about 1 mm, but the width of each of the mesh lines is not limited thereto.

The patch part 301a may have a rhombus shape and have a first side 301s1a, a second side 301s2a, a third side 301s3a, and a fourth side 301s4a. Each of the first side 301s1a and the third side 301s3a may be defined by mesh lines extending along the second cross direction DRC2. Each of the second side 301s2a and the fourth side 301s4a may be defined by mesh lines extending along the first cross direction DRC1.

Figure 5C:
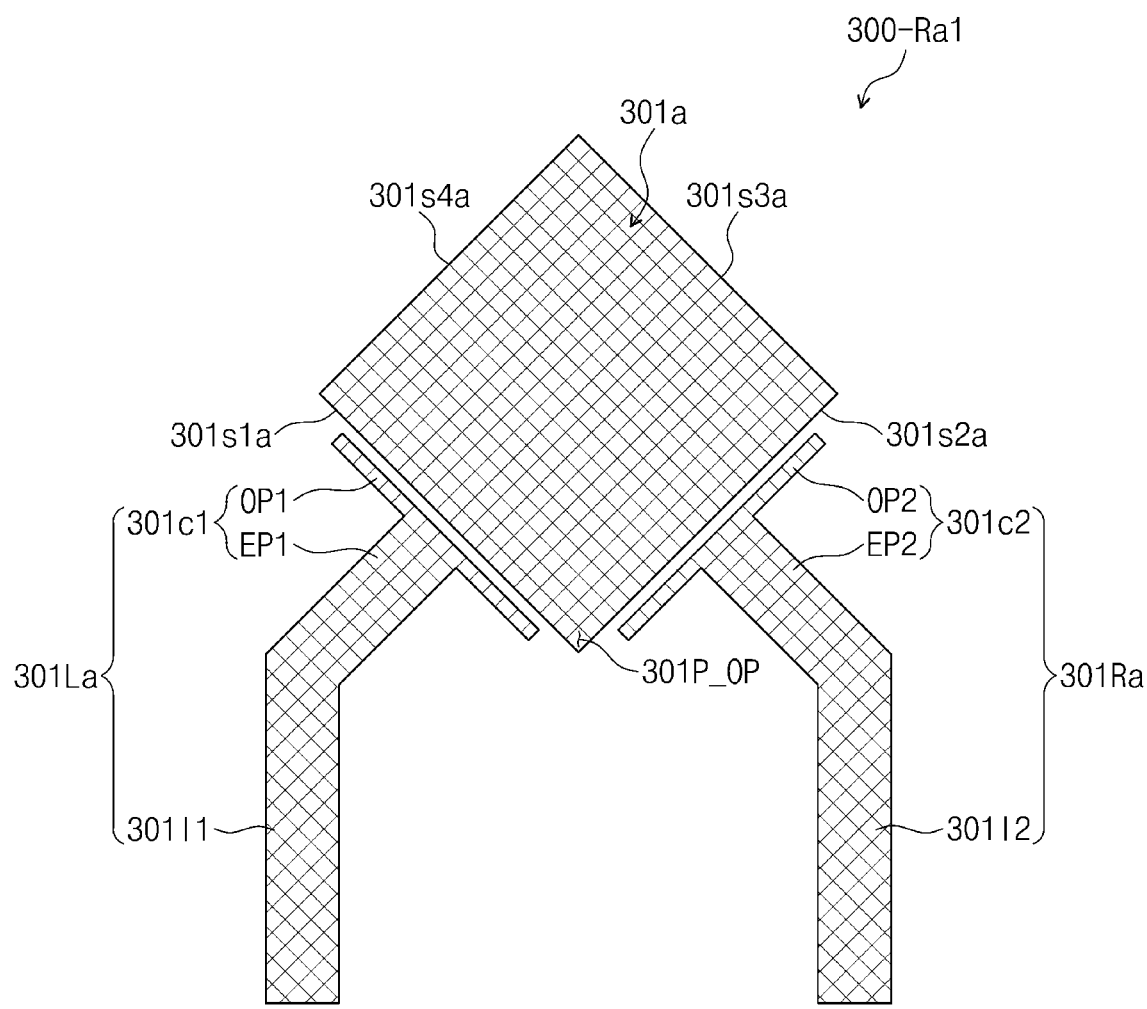
FIG. 5C is a plan view of an antenna according to an embodiment of the inventive concept.

FIG. 5C is a plan view of an antenna according to an embodiment of the inventive concept. In description about FIG. 5C, like reference numerals are given to like elements described in FIGS. 5A and 5B, and the descriptions thereabout will be omitted.

Referring to FIG. 5C, an antenna 300-Ra1 may include the patch part 301a, the first side transmission part 301La, and the second side transmission part 301Ra.

The patch part 301a may have a mesh structure in which a plurality of openings 301P_OP are defined. The plurality of openings 301P_OP may overlap a light emission area of the display panel 100 (see FIG. 2A). Each of the first side transmission part 301La and the second side transmission part 301Ra may also have the same mesh structure as the patch part 301a.

Even though mesh lines provided in the patch part 301a, the first side transmission part 301La, and the second side transmission part 301Ra contain an opaque material, an image displayed through the active area 100A (see FIG. 3A) may not be blocked. The width of each of the mesh lines may be about 1 mm, but the width of each of the mesh lines is not limited thereto.

Figure 6A:
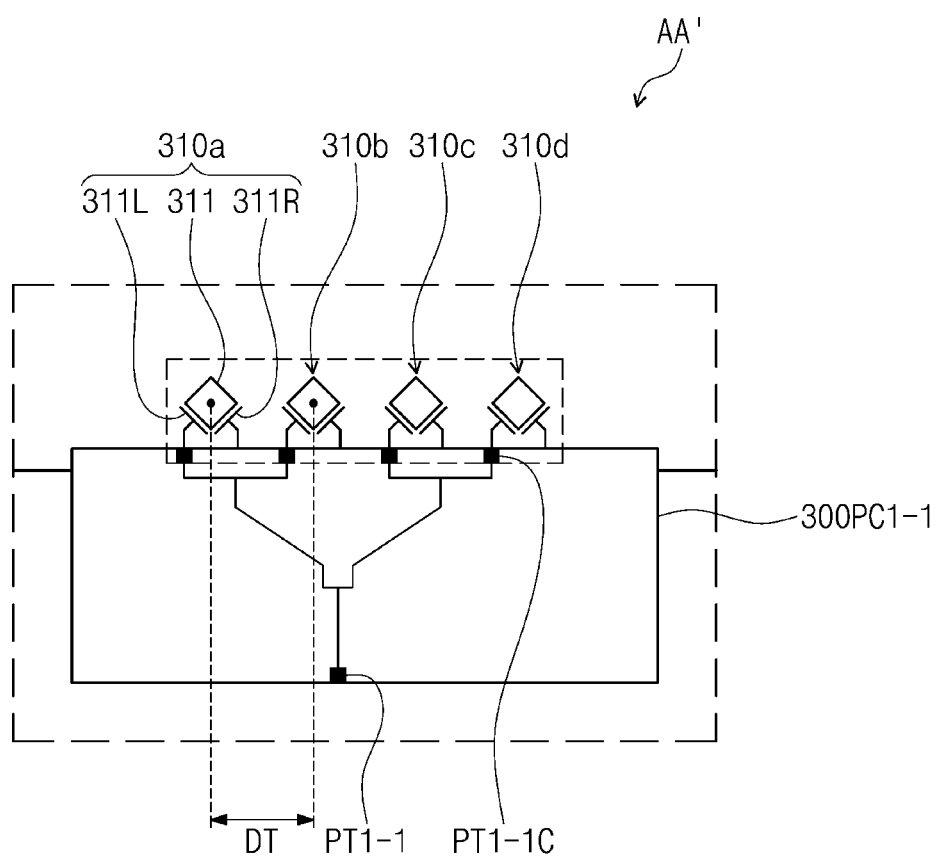
FIG. 6A is a plan view illustrating an area corresponding to area AA' shown in FIG. 3A.
Figure 6B:
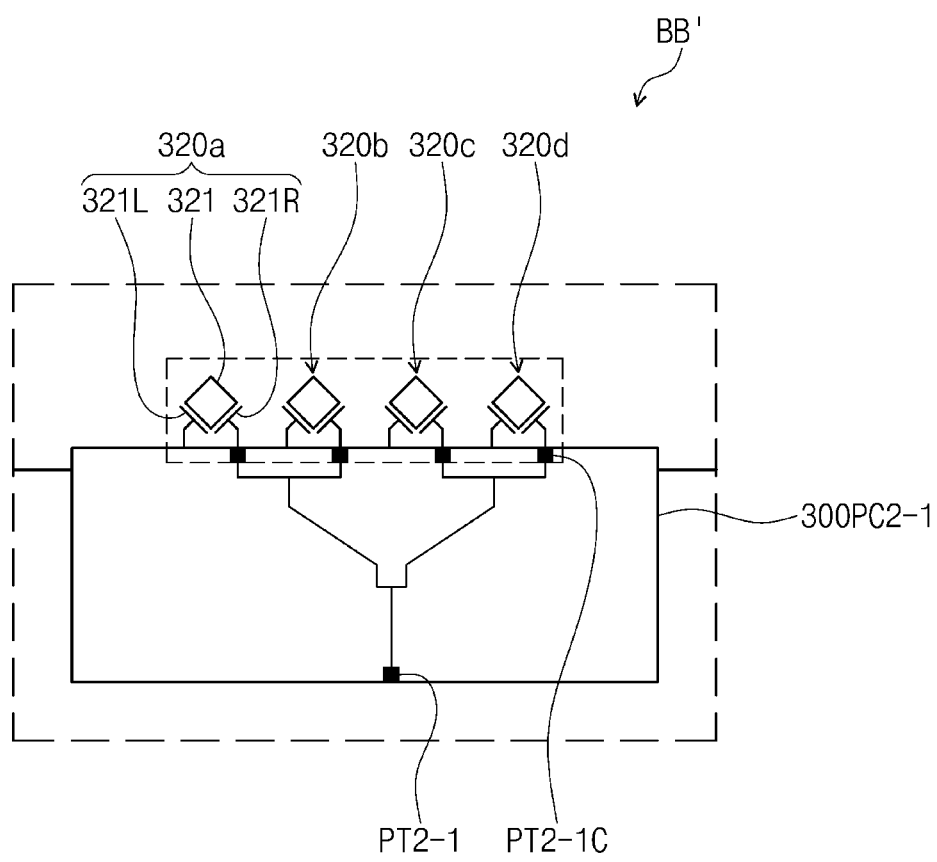
FIG. 6B is a plan view illustrating an area corresponding to area BB' shown in FIG. 3A.

FIG. 6A is a plan view illustrating an area corresponding to area AA' shown in FIG. 3A. FIG. 6B is a plan view illustrating an area corresponding to area BB' shown in FIG. 3A.

Referring to FIGS. 6A and 6B, the first antennas 310a, 310b, 310c, and 310d may receive signals through the first circuit film 3000PC1-1. The first circuit film 300PC1-1 may include one first common port PT1-1 (or a first port) and first opposite ports PT1-1C. The number of the first opposite ports PT1-1C may be the same as that of the first antennas 310a, 310b, 310c, and 310d. The first common port PT1-1 may be branched to be connected to the first opposite ports PT1-1C. The first common port PT1-1 may be connected to the first opposite ports PT1-1C through one or more power distributors.

The second antennas 320a, 320b, 320c, and 320d may receive signals through the second circuit film 3000PC2-1. The second circuit film 300PC2-1 may include one second common port PT2-1 (or a second port) and second opposite ports PT2-1C. The number of the second opposite ports PT2-1C may be the same as that of the second antennas 320a, 320b, 320c, and 320d. The one second common port PT2-1 may be branched to be connected to the second opposite ports PT2-1C.

The first antennas 310a, 310b, 310c, and 310d may be connected in parallel to the first common port PT1-1. The second antennas 320a, 320b, 320c, and 320d may be connected in parallel to the second common port PT2-1. The first antennas 310a, 310b, 310c, and 310d may be a 1×4 parallel fed array antenna operating as one port, and the second antennas 320a, 320b, 320c, and 320d may be a 1×4 parallel fed array antenna operating as one port.

The interval DT between the center of the first patch part 311 of one first antenna 310a among the first antennas 310a, 310b, 310c, and 310d, and the center of the first patch part 311 of another first antenna 310b, which is adjacent to the one first antenna 310a, may be about 0.5 to about 0.8 times of a reference wavelength. The interval DT between the center of the first patch part 311 of one first antenna 310a among the first antennas 310a, 310b, 310c, and 310d, and the center of the first patch part 311 of another first antenna 310b, which is adjacent to the one first antenna 310a, may be a half of a reference wavelength $l_0$. The reference wavelength $l_0$ may be a wavelength in the air or a vacuum at a specific frequency, and, in an embodiment, the reference wavelength may be about 13.6 mm. Therefore, the interval DT may be about 6.8 mm. The second antennas 320a, 320b, 320c, and 320d may be spaced apart from each other the same interval as that of the first antennas 310a, 310b, 310c, and 310d.

Figure 7A:
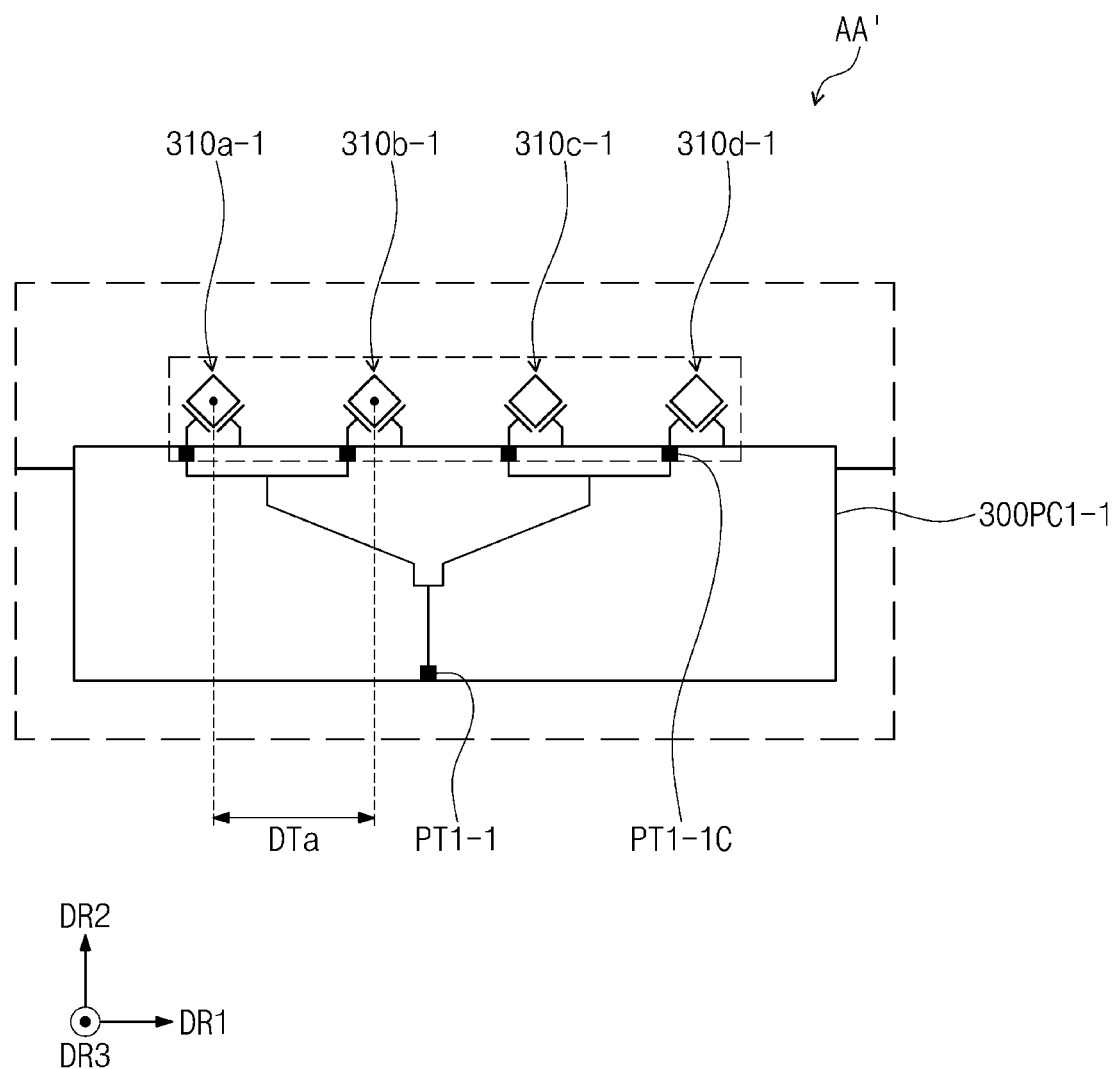
FIG. 7A is a plan view illustrating an area corresponding to area AA' shown in FIG. 3A.
Figure 7B:
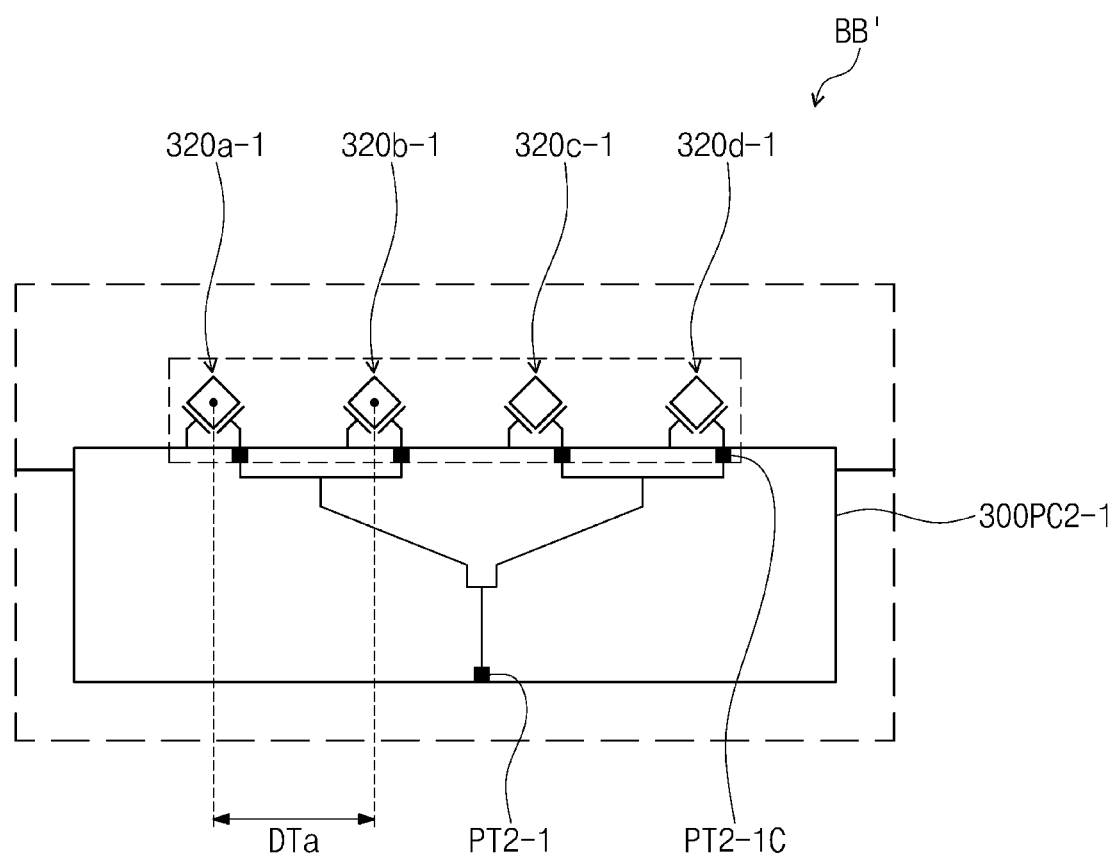
FIG. 7B is a plan view illustrating an area corresponding to area BB' shown in FIG. 3A.

FIG. 7A is a plan view illustrating an area corresponding to area AA' shown in FIG. 3A. FIG. 7B is a plan view illustrating an area corresponding to area BB' shown in FIG. 3A.

Referring to FIGS. 7A and 7B, the first antennas 310a-1, 310b-1, 310c-1, and 310d-1 may receive signals through the first circuit film 300PC1-1. The second antennas 320a-1, 320b-1, 320c-1, and 320d01 may receive signals through the second circuit film 300PC2-1.

The interval DTa between the center of the first patch part of one first antenna 310a-1 among the first antennas 310a-1, 310b-1, 310c-1, and 310d-1, and the center of the first patch part of another first antenna 310b-1 which is disposed adjacent to the one first antenna 310a-1, may be 0.8 times of a reference wavelength $l_0$. In an embodiment, the reference wavelength $l_0$ is about 13.6 mm. Therefore, the interval DTa may be about 10.8 mm. The second antennas 320a-1, 320b-1, 320c-1, and 320d-1 may be spaced apart from each other the same interval as that of the first antennas 310a-1, 310b-1, 310c-1, and 310d-1.

Figure 8:
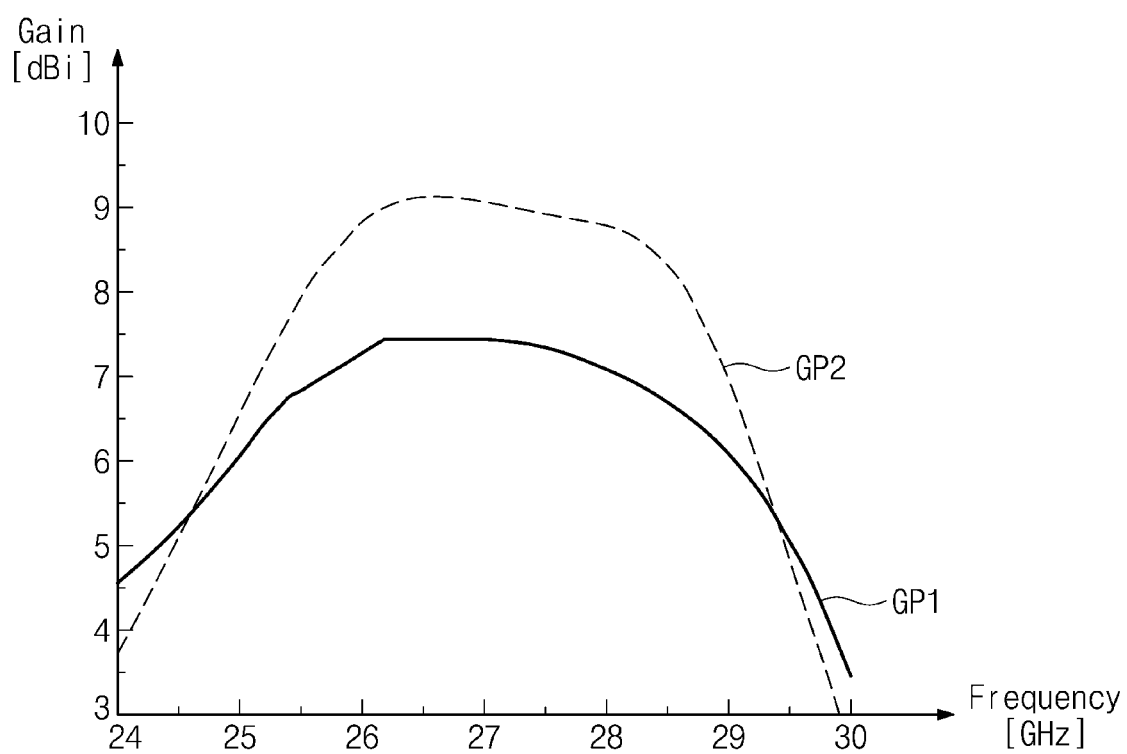
FIG. 8 is a graph illustrating the Boresight gain versus frequency of antennas.

FIG. 8 is a graph of the Boresight gains versus frequency of antennas.

Referring to FIGS. 6A, 7A, and 8, a first graph GP1 illustrates the Boresight gain versus frequency of the first antennas 310a, 310b, 310c, 310d, and a second graph GP2 illustrates Boresight gain versus frequency of the first antennas 310a-1, 310b-1, 310c-1 and 310d-1.

Referring to FIG. 8, at the same frequency, for example, at about 27 GHz, the first antennas 310a-1, 310b-1, 310c-1, and 310d-1 have a higher gain than the first antennas 310a, 310b, 310c, and 310d. In other words, the gain of a synthetic beam may be controlled by adjusting an array interval between antennas.

As the array interval between the first antennas 310a-1, 310b-1, 310c-1, and 310d-1 increases, the effective aperture of the array antenna may also increase. As the effective aperture of the array antenna increases, the directivity may be improved, and accordingly the radiation gain of the antenna may also be improved.

Figure 9:
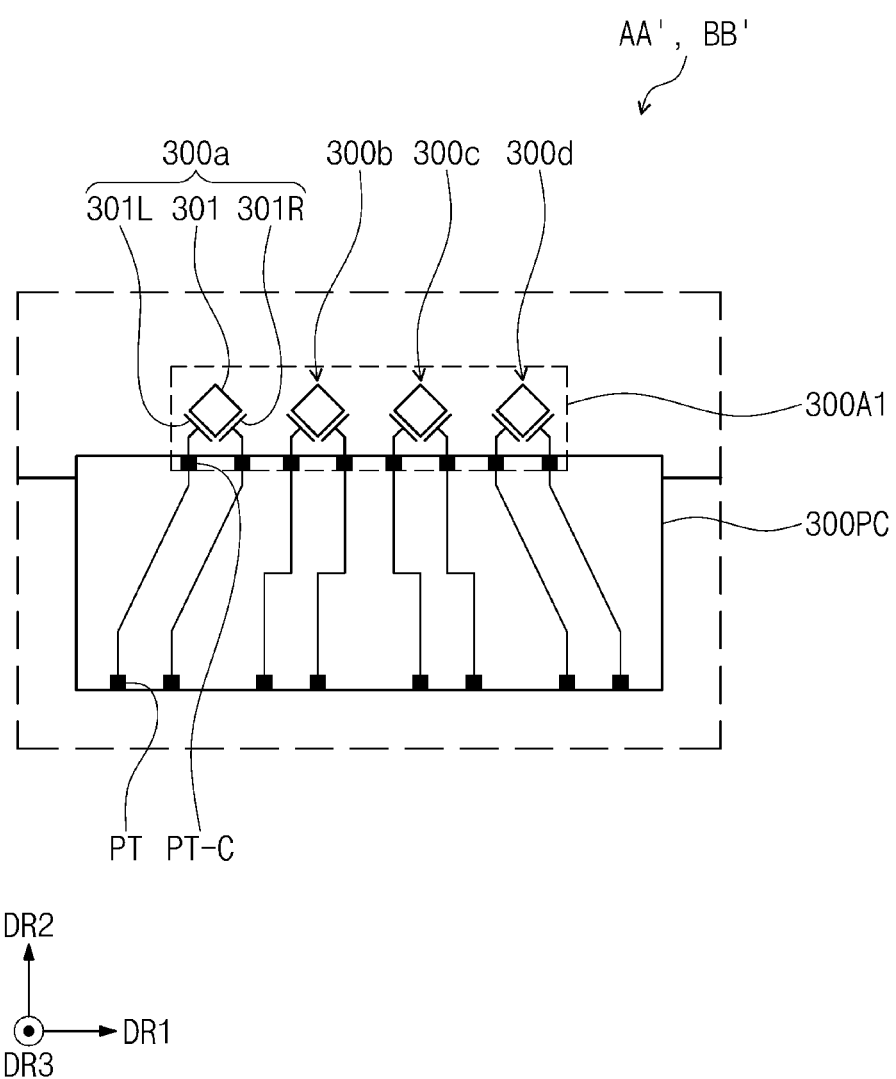
FIG. 9 is a plan view illustrating an area corresponding to areas AA' and BB' shown in FIG. 3A.

FIG. 9 is a plan view illustrating an area corresponding to areas AA' and BB' shown in FIG. 3A.

Referring to FIG. 9, the antennas 300a, 300b, 300c, and 300d may receive or provide signals through a circuit film 300PC. The circuit film 300PC may include ports PT and opposite ports PT-C. The signals provided through the ports PT may be delivered to the opposite ports PT1-C, and the signals provided through the opposite ports PT1-C may be provided to the ports PT1, respectively. The number of ports PT may be the same as that of the opposite ports PT-C. One port PT may be connected to one opposite port PT-C. Each of the numbers of the ports PT and the opposite ports PT-C may be double the number of the antennas 300a, 300b, 300c, and 300d.

One antenna 300a may receive or deliver signals or energy from the two first and second side transmission parts 301L and 301R. One patch part 301 may provide two polarization characteristics. For example, the one patch part 301 may provide first polarization characteristics in response to the signal provided from the first side transmission part 301L, and the one patch part 301 may provide second polarization characteristics in response to the signal provided from the second side transmission part 301R.

In addition, a Radio Frequency Integrated Circuit (RFIC) may provide signals having different phases and/or amplitudes to the ports PT. Accordingly, the antennas 300a, 300b, 300c, and 300d may be controlled to strongly transmit or receive signals in a specific direction. In other words, the antennas 300a, 300b, 300c, and 300d may operate as a beamforming antenna.

One antenna 300a may be referred to as a first antenna. In this case, the patch part 301 may be referred to as a first patch part, the first side transmission part 301L as a first transmission part, and the second side transmission part 301R as a first additional transmission part. In addition, one antenna 300a may be referred to as a second antenna. In this case, the patch part 301 may be referred to as a second patch part, the first side transmission part 301L as a second additional transmission part, and the second side transmission part 301R as a second transmission part.

Figure 10:
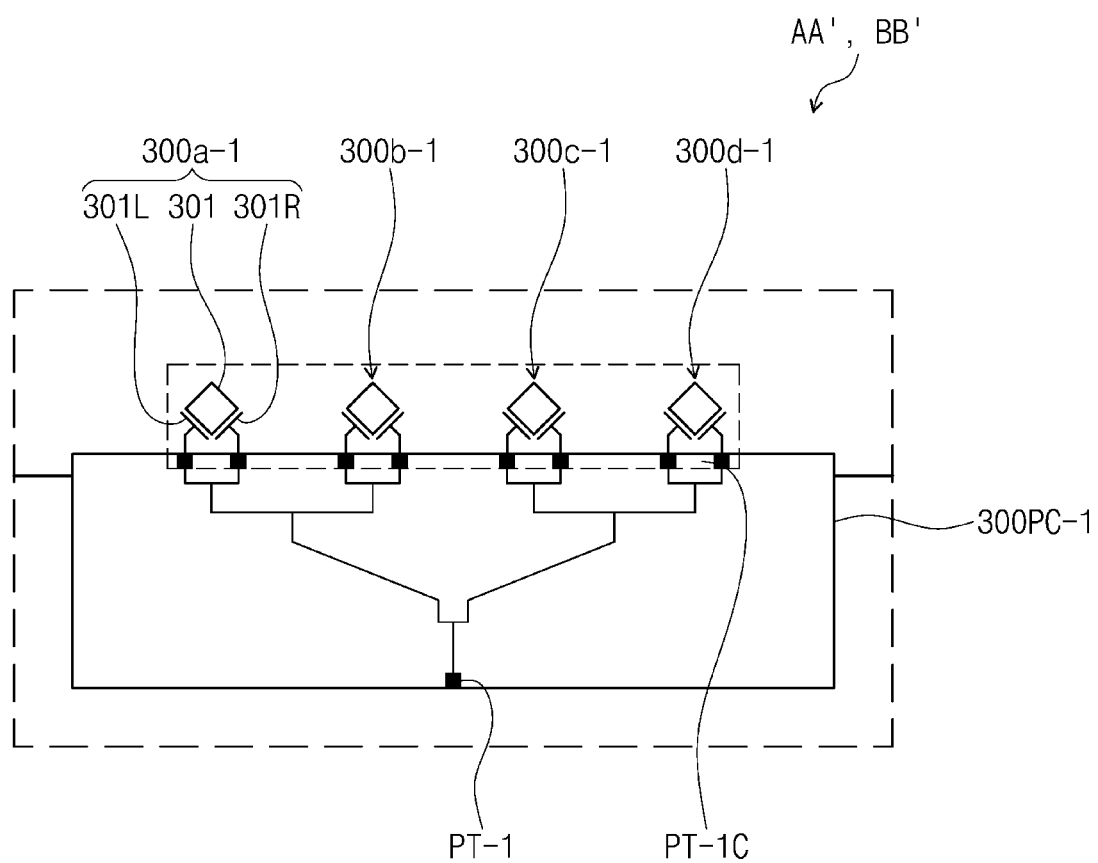
FIG. 10 is a plan view illustrating an area corresponding to areas AA' and BB' shown in FIG. 3A.

FIG. 10 is a plan view illustrating an area corresponding to areas AA' and BB' shown in FIG. 3A.

Referring to FIG. 10, antennas 300a-1, 300b-1, 300c-1, and 300d-1 may receive or provide signals through a circuit film 300PC-1.

The circuit film 300PC-1 may include one common port PT-1 and opposite ports PT-1C. The number of the opposite ports PT-1C may be double the number of the antennas 300a-1, 300b-1, 300c-1, and 300d-1. The common port PT-1 may be electrically connected to the opposite ports PT-1C. The common port PT-1 may be connected to the opposite ports PT-1C through one or more power distributors.

One antenna 300a-1 may receive or deliver signals or energy from the two first and second side transmission parts 301L and 301R. One patch part 301 may provide two polarization characteristics. For example, the one patch part 301 may provide first polarization characteristics through the signal provided from the first side transmission part 301L and the one patch part 301 may provide second polarization characteristics through the signal provided from the second side transmission part 301R.

The antennas 300a-1, 300b-1, 300c-1, and 300d-1 may be connected in parallel to the common port PT-1. The antennas 300a-1, 300b-1, 300c-1, and 300d-1 may be a 1×4 parallel fed array antenna operating as one port.

One antenna 300a-1 may be referred to as a first antenna. In this case, the patch part 301 may be referred to as a first patch part, the first side transmission part 301L as a first transmission part, and the second side transmission part 301R as a first additional transmission part. In addition, one antenna 300a may be referred to as a second antenna. In this case, the patch part 301 may be referred to as a second patch part, the first side transmission part 301L as a second additional transmission part, and the second side transmission part 301R as a second transmission part.

Figure 11A:
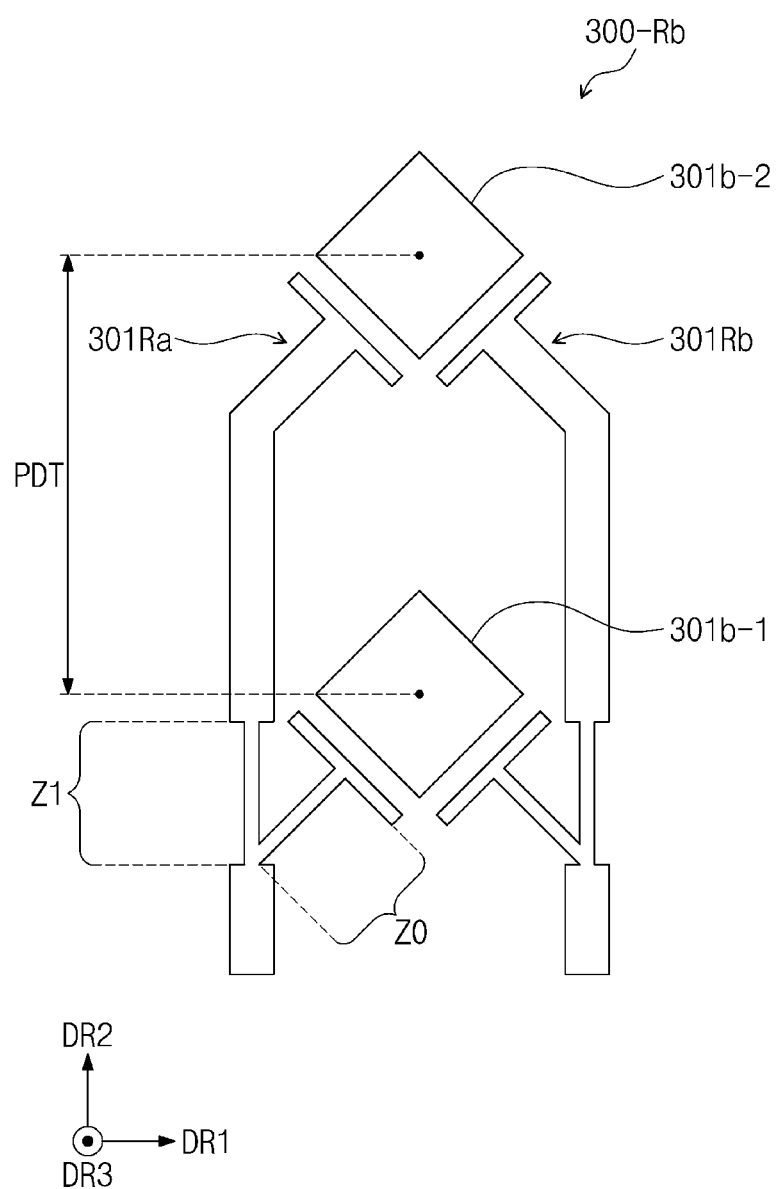
FIG. 11A is a plan view illustrating an antenna according to an embodiment of the inventive concept.
Figure 11B:
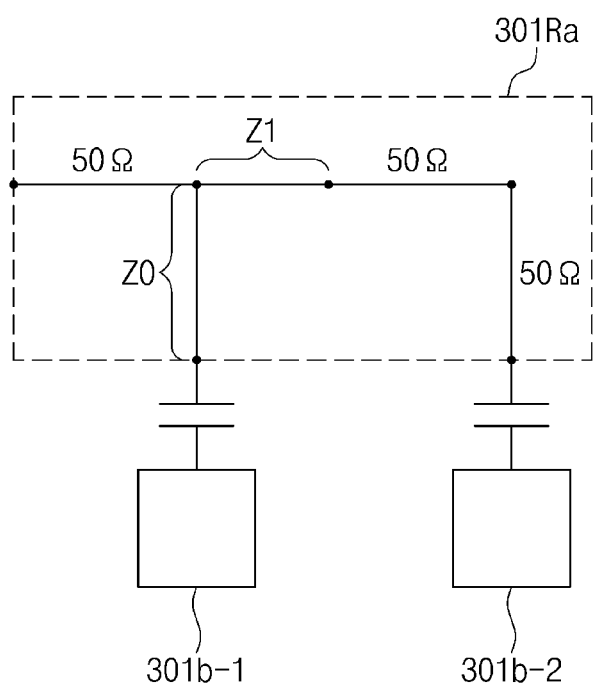
FIG. 11B is an equivalent circuit diagram of a first side transmission part, a patch part, and an extension patch part.

FIG. 11A is a plan view illustrating an antenna according to an embodiment of the inventive concept. FIG. 11B is an equivalent circuit diagram of a first side transmission part, a patch part, and an extension patch part.

Referring to FIGS. 11A and 11B, an antenna 300-Rb may include a patch part 301b-1, an extension patch part 301b-2, a transmission part 301Ra, and a symmetric transmission part 301Rb. According to the present embodiment, the antenna 300-Rb includes two patch parts 301b-1 and 301b-2.

The patch part 301b-1 may have the same shape as the extension patch part 301b-2. The extension patch part 301b-2 may be spaced apart from the patch part 301b-1 in the second direction DR2. The distance PDT between the center of the patch part 301b-1 and the center of the extension patch part 301b-2 may be designed with a guided wavelength $l_g$. In this case, the patch part 301b-1 and the extension patch part 301b-2 may be fed in-phase.

The guided wavelength $l_g$ may be derived by using the effective permittivity between the antenna 300-Rb and the ground. For example, in case of having a laminated structure shown in FIG. 2A, the effective permittivities of dielectric layers disposed between the antenna layer 300 and a bottom layer 500 are calculated, and the guided wavelength of a signal may be calculated on the basis of the effective permittivities.

The transmission part 301Ra may be symmetrical about a line of symmetry extending along the second direction DR2. The transmission part 301Ra may include a first coupler extending toward the patch part 301b-1, and a second coupler extending toward the extension patch part 301b-2. The transmission part 301Ra may be spaced apart from the patch part 301b-1 and the extension patch part 301b-2.

The patch part 301b-1 and the extension patch part 301b-2 may be arrayed in a series-fed manner. As the number of patch parts 301b-1 and 301b2 included in the antenna 300-Rb increases, the entire size of the antenna may increase. In this case, the antenna gain may be improved.

Power input through the transmission part 301Ra may be equally delivered to the patch part 301b-1 and the extension patch part 301b-2. The characteristic impedance of an input stage of the transmission part 301Ra may be about 50 ohms. The power provided to the input stage may be equally distributed at a first branch point.

Each of the characteristic impedance of a first output stage facing the patch part 301b-1 and the characteristic impedance of a second output stage facing the extension patch part 301b-2 may be determined to about 100 ohms. For impedance matching between the input stage and the first output stage, a first λ/4 transformer Z0 may be provided. For impedance matching between the input stage and the second output stage, a second λ/4 transformer Z1 may be provided. The characteristic impedance of each of the first λ/4 transformer Z0 and the second λ/4 transformer Z1 may be $\sqrt{50 \times 100}\Omega$.

One antenna 300-Rb may be referred to as a first antenna. In this case, the patch part 301b-1 may be referred to as a first patch part, the extension patch part 301b-2 as a first extension patch part, the first side transmission part 301Ra as a first transmission part, and the second side transmission part 301Rb as a first symmetric transmission part. In addition, one antenna 300-Rb may be referred to as a second antenna. In this case, the patch part 301b-1 may be referred to as a second patch part, the extension patch part 301b-2 as a second extension patch part, the first side transmission part 301Ra as a second symmetric transmission part, and the second side transmission part 301Rb as a second transmission part.

In one embodiment, when the antenna 300-Rb is the first antenna, the patch part 301b-1 and the extension patch part 301b-2 may receive or output signals through the first side transmission part 301Ra, and, when the antenna 300-Rb is the second antenna, the patch part 301b-1 and the extension patch part 301b-2 may receive or output signals through the second side transmission part 301Rb. Here, the second side transmission part 301Rb of the first antenna and the first side transmission part 301Ra of the second antenna may be in a floated state.

In one embodiment, when the antenna 300-Rb is the first antenna or the second antenna, the patch part 301b-1 and the extension patch part 301b-2 may receive or output signals through both the first side transmission part 301Ra and the second side transmission part 301Rb.

Figure 12A:
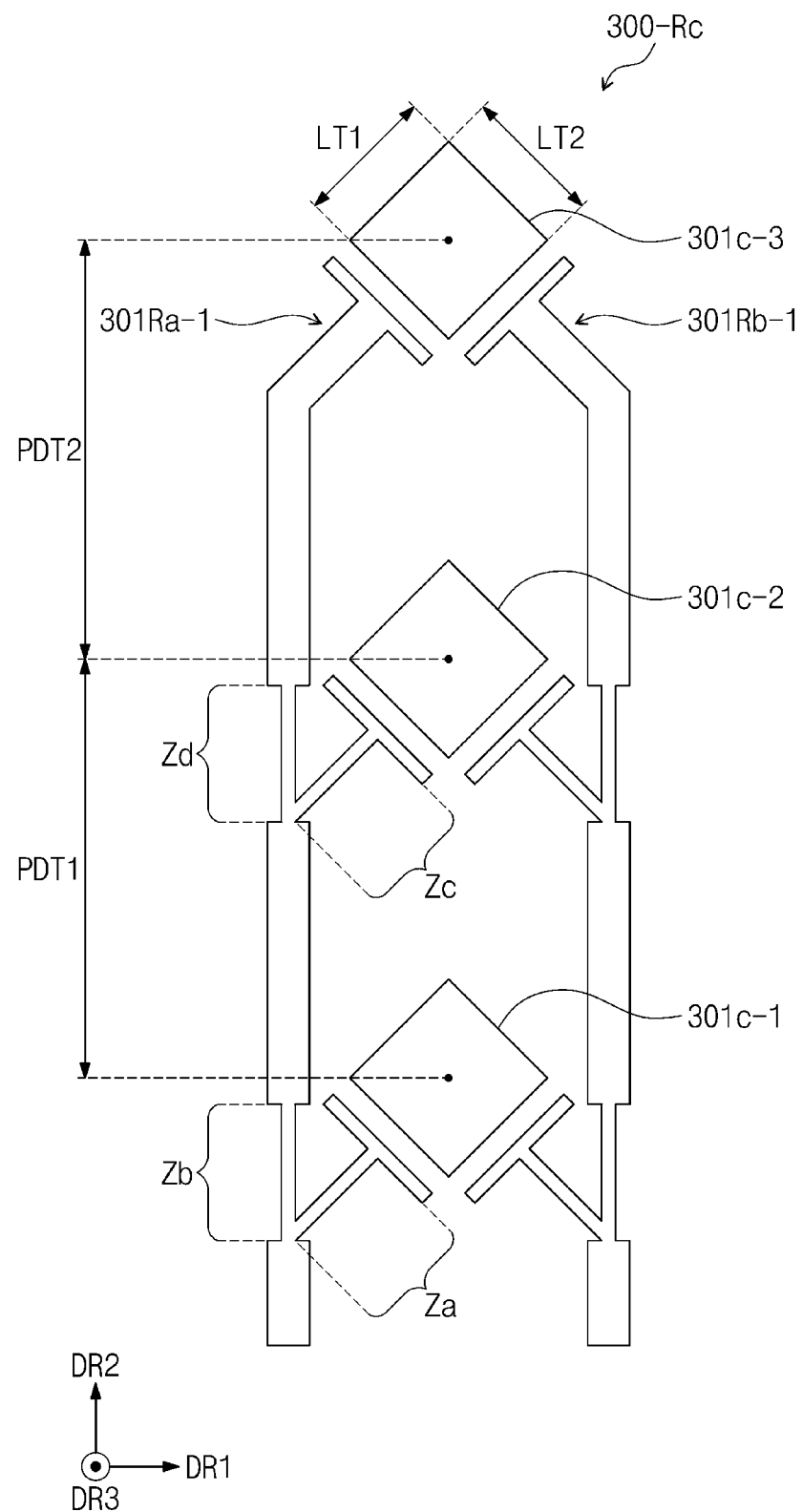
FIG. 12A is a plan view illustrating an antenna according to an embodiment of the inventive concept.
Figure 12B:
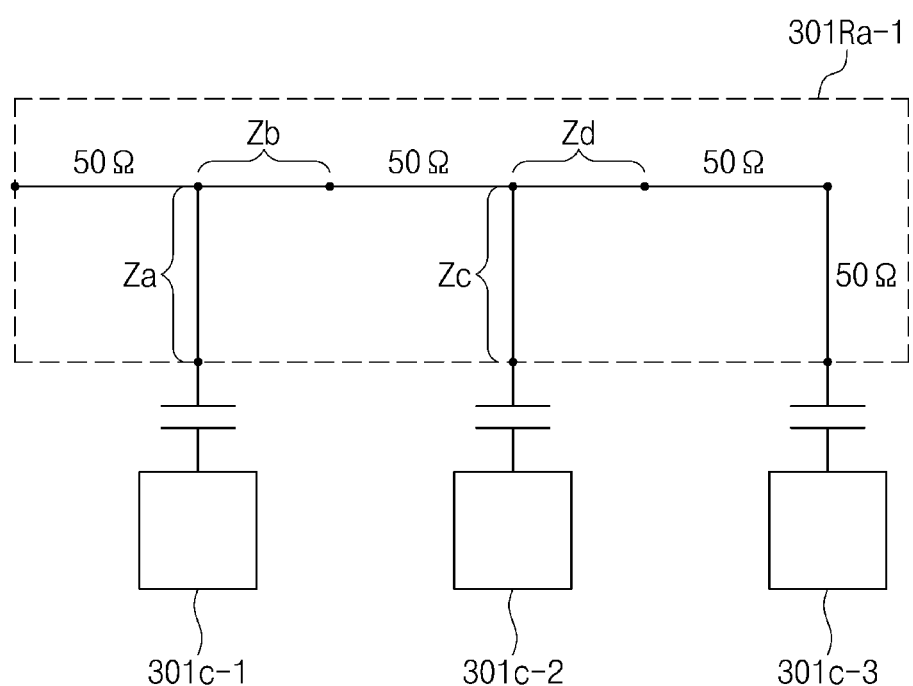
FIG. 12B is an equivalent circuit diagram of a first side transmission part, a patch part, and an extension patch part.

FIG. 12A is a plan view illustrating an antenna according to an embodiment of the inventive concept. FIG. 12B is an equivalent circuit diagram of a first side transmission part, a patch part, and an extension patch part.

Referring to FIGS. 12A and 12B, the antenna 300-Rc may include the patch part 301c-1, the extension patch part 301c-2, an additional extension patch part 301c-3, a transmission part 301Ra-1, and a symmetric transmission part 301Rb-1. According to the present embodiment, the antenna 300-Rb includes three patch parts 301c-1, 301c-2, and 301c-3.

The shapes of the patch part 301c-1, the extension patch part 301c-2, and the additional extension patch part 301c-3 may be the same. The extension patch part 301c-2 is spaced apart from the patch part 301c-1 in the second direction DR2, and the additional extension patch part 301c-3 may be spaced apart from the extension patch part 301c-2 in the second direction DR2.

The sizes of the patch part 301c-1, the extension patch part 301c-2, and the additional extension patch part 301c-3 may be the same. For example, first lengths LT1 of first sides of the patch part 301c-1, the extension patch part 301c-2, and the additional extension patch part 301c-3 may be the same, and second lengths LT2 of second sides of the patch part 301c-1, the extension patch part 301c-2, and the additional extension patch part 301c-3 may be the same. In addition, the first lengths LT1 and the second lengths LT2 may be the same. For example, each of the first lengths LT1 and the second length LT2 may be about 3.1 mm, but a length of each of the first lengths LT1 and the second length LT2 is not particularly limited thereto.

Each of the distance PDT1 between the center of the patch part 301c-1 and the center of the extension patch part 301c-2, and the distance PDT2 between the center of the extension patch part 301c-2 and the center of the additional extension patch part 301c-3 may be designed with the guided wavelength $l_g$. In this case, the patch part 301c-1, the extension patch part 301c-2, and the additional extension patch part 301c-3 may be fed in phase.

The transmission part 301Ra-1 may be symmetrical about a line of symmetry extending along the second direction DR2. The transmission part 301Ra-1 may include a first coupler extending toward the patch part 301c-1, a second coupler extending toward the extension patch part 301c-2, and a third coupler extending toward the additional extension patch part 301c-3. The transmission part 301Ra-1 may be spaced apart from the patch part 301c-1, the extension patch part 301c-2, and the additional extension patch part 301c-3.

The patch part 301c-1, the extension patch part 301c-2, and the additional extension patch part 301c-3 may be arrayed in a series-fed manner. As the number of patch parts 301c-1, 301c-2, and 301c-3 included in the antenna 300-Rc increases, the entire size of the antenna may increase. In this case, the antenna gain may be improved. FIGS. 11A and 12A illustrate that the numbers of patch parts arrayed in a series-fed manner are two and three respectively, but the number of patch parts is not limited thereto.

The power input through the transmission part 301Ra-1 may be equally distributed to each of the patch part 301c-1, the extension patch part 301c-2, and the additional extension patch part 301c-3. The characteristic impedance of an input stage of the transmission part 301Ra-1 may be about 50 ohms. The power provided to the input stage may be primarily distributed at a first branch point. For example, ⅓ of the input power may be delivered to the first coupler, and ⅔ of the input power may be delivered to a second branch point of the transmission part 301Ra-1.

The characteristic impedance of a first output stage facing the patch part 301c-1 may be about 150 ohms, and the characteristic impedance viewed toward the second branch point from the first branch point may be 75 ohms. For impedance matching, a first λ/4 transformer Za and a second λ/4 transformer Zb may be provided at the first branch point. The characteristic impedance of the first λ/4 transformer Za may be $\sqrt{50 \times 150}$ ohms, and the characteristic impedance of the second λ/4 transformer Zb may be $\sqrt{50 \times 75}$ ohms.

A transmission line having the characteristic impedance of 50 ohms may be provided between the second branch point and the second λ/4 transformer Zb. ⅔ of the input power may be provided to the second branch point through the transmission line having the characteristic impedance of 50 ohms. ½ of ⅔ of the power may be delivered at the second branch point to a second output unit facing the extension patch part 301c-2, and the remaining ½ may be delivered to a third output stage facing the additional extension patch part 301c-3. The characteristic impedance of the second output stage may be determined as about 100 ohms, and the characteristic impedance of the third output stage may be determined as about 100 ohms. For impedance matching between the transmission line and the second output stage, a third λ/4 transformer Zc may be provided between the transmission line and the second output stage. In addition, for impedance matching between the transmission line and the third output stage, a fourth λ/4 transformer Zd may be provided between the transmission line and the third output stage. The respective characteristic impedances of the third λ/4 transformer Zc and the fourth λ/4 transformer Zd may be $\sqrt{50 \times 100}$ ohms.

Figure 13:
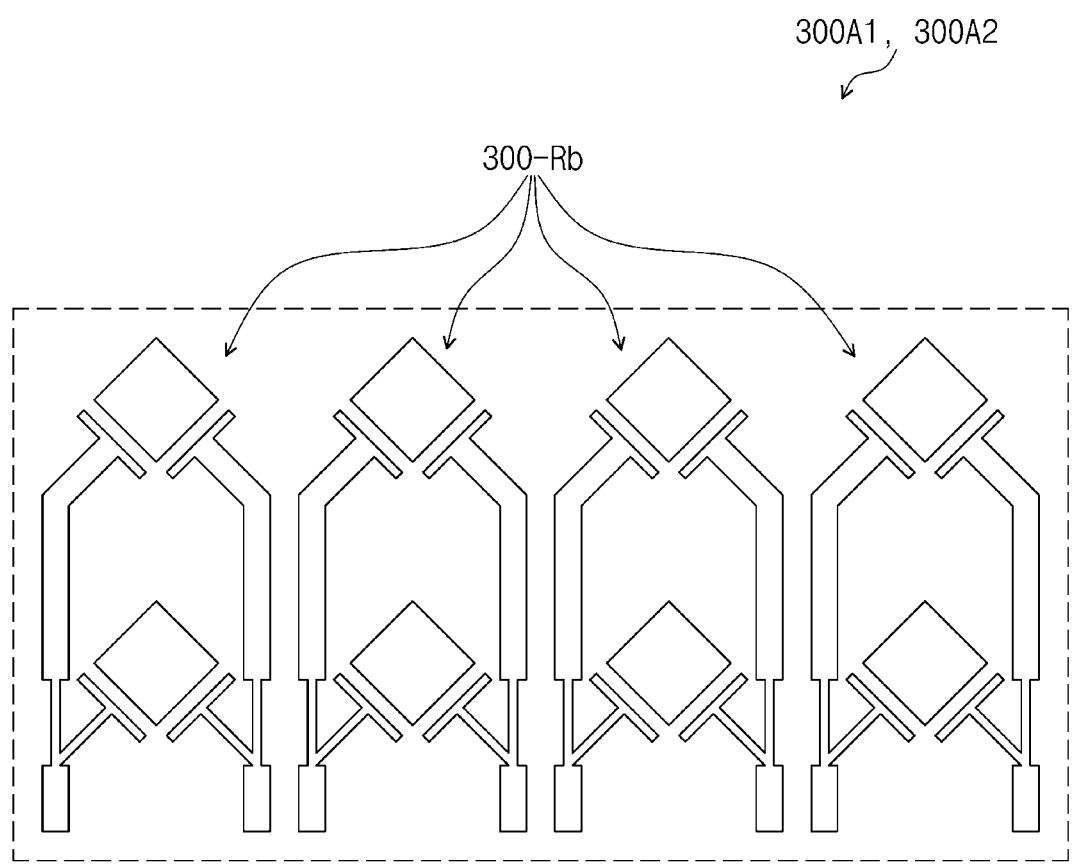
FIG. 13 is an enlarged plan view of antennas disposed in a first antenna area and a second antenna area according to an embodiment of the inventive concept.

FIG. 13 is an enlarged plan view of antennas disposed in a first antenna area and a second antenna area according to an embodiment of the inventive concept.

Referring to FIG. 13, antennas 300-Rb may be disposed in each of the first antenna area 300A1 and a second antenna area 300A2. The antennas 300-Rb disposed in the first antenna area 300A1 may be referred to as first antennas and the antennas 300-Rb disposed in the second antenna area 300A2 may be referred to as second antennas. The antennas 300-Rb disposed in each of the first antenna area 300A1 and the second antenna area 300A2 may be a 2×4 array antenna.

In one embodiment, the antennas 300-Rb arrayed in the first direction DR1 may be connected to different ports. In this case, the phases/amplitudes of signals provided to the respective antennas 300-Rb may be differently adjusted. In other words, the antennas 300-Rb may be controlled to strongly transmit or receive signals in a specific direction. Alternatively, in one embodiment, the antennas 300-Rb arrayed in the first direction DR1 may be connected to the same common port.

When the number of patch parts included in each of the antennas 300-Rb is adjusted, the antenna gains may be adjusted. The more the number of the patch parts increases, the more the antenna gain increases. A change in the antenna gain according to the increase in the number of patch parts may be expressed as Equation (1).

$$\text{Change in the antenna gain} = 10 * \log_{10}(Ni/No) \qquad (1)$$

where $N_o$ may denote the number of patch parts included in one antenna included in a first comparison target, Ni may denote the number of patch parts included in one antenna included in a second comparison target.

The antenna gain (dBi) of the antennas 300-Rb shown in FIG. 13 may be greater than that of the antennas 310a, 310b, 310c, and 310d shown in FIG. 4A. The number of the first patch part 311 included in the one first antenna 310a shown in FIG. 4A is one, and the number of the patch parts included in one antenna 300-Rb shown in FIG. 13 is two. Accordingly, it may be known that the gain of the antennas shown in FIG. 13 is improved by about 3.01 dBi ($10*\log_{10}(2/1)$), in comparison to the antennas shown in FIG. 4A.

Figure 14:
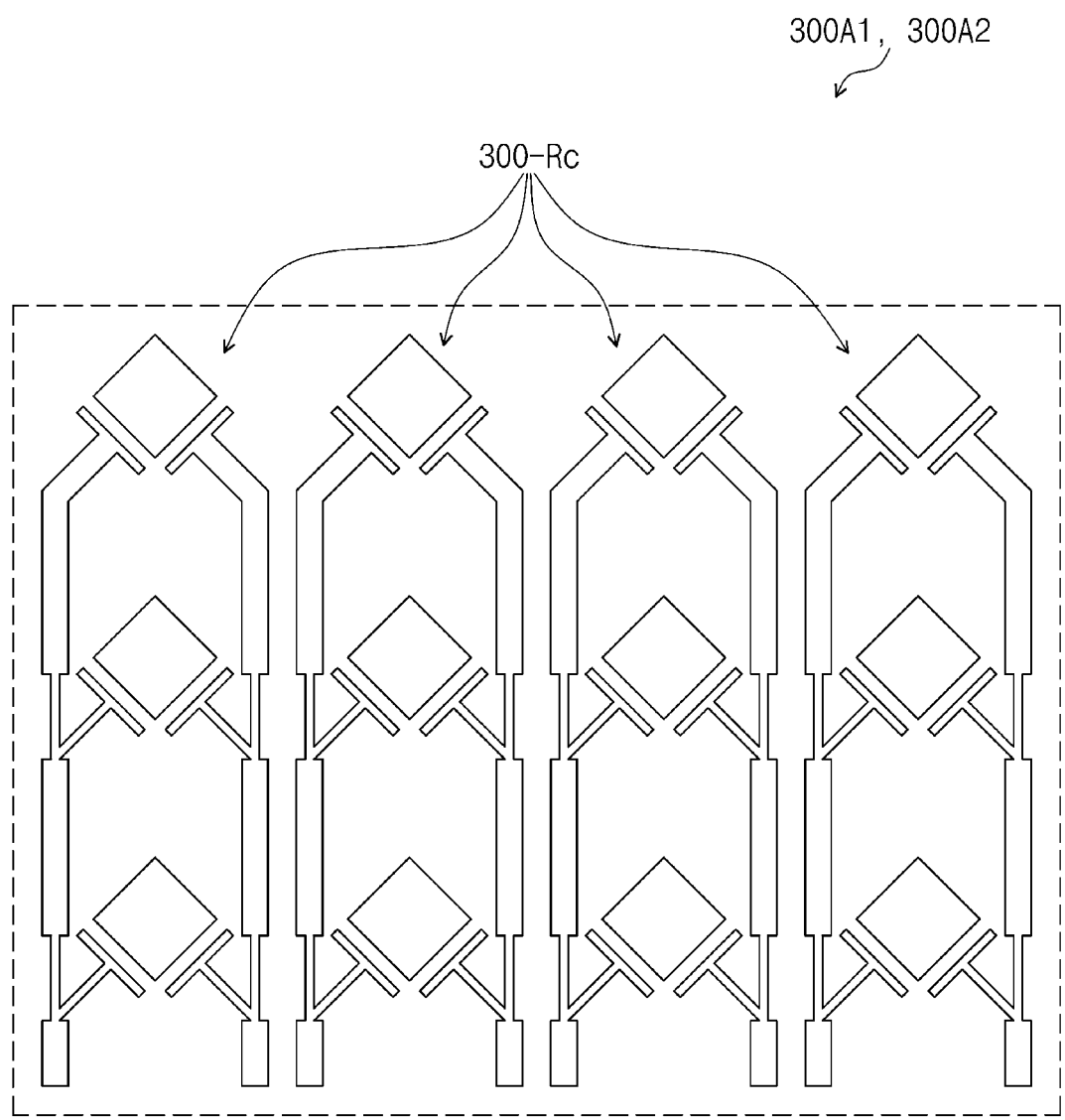
FIG. 14 is an enlarged plan view of antennas disposed in the first antenna area and the second antenna area according to an embodiment of the inventive concept.

FIG. 14 is an enlarged view of antennas disposed in the first antenna area and the second antenna area according to an embodiment of the inventive concept.

Referring to FIG. 14, antennas 300-Rc may be disposed in each of the first antenna area 300A1 and a second antenna area 300A2. The antennas 300-Rc disposed in the first antenna area 300A1 may be referred to as first antennas, and the antennas 300-Rc disposed in the second antenna area 300A2 may be referred to as second antennas. The antennas 300-Rc disposed in each of the first antenna area 300A1 and the second antenna area 300A2 may be a 3×4 array antenna.

The number of the first patch part 311 included in the one first antenna 310a shown in FIG. 4A is one, and the number of the patch parts included in one antenna 300-Rc shown in FIG. 14 is three. Accordingly, it may be known that the gain of the antennas shown in FIG. 14 is improved by about 4.77 dBi ($10*\log_{10}(3/1)$), in comparison to the antennas shown in FIG. 4A.

Unlike what is shown in FIGS. 13 and 14, the number of the patch parts included in each of the antennas may be three or more. In other words, the number of patch parts included in one antenna may be determined in consideration of the area and location of an area in which the antenna is provided.

Figure 15:
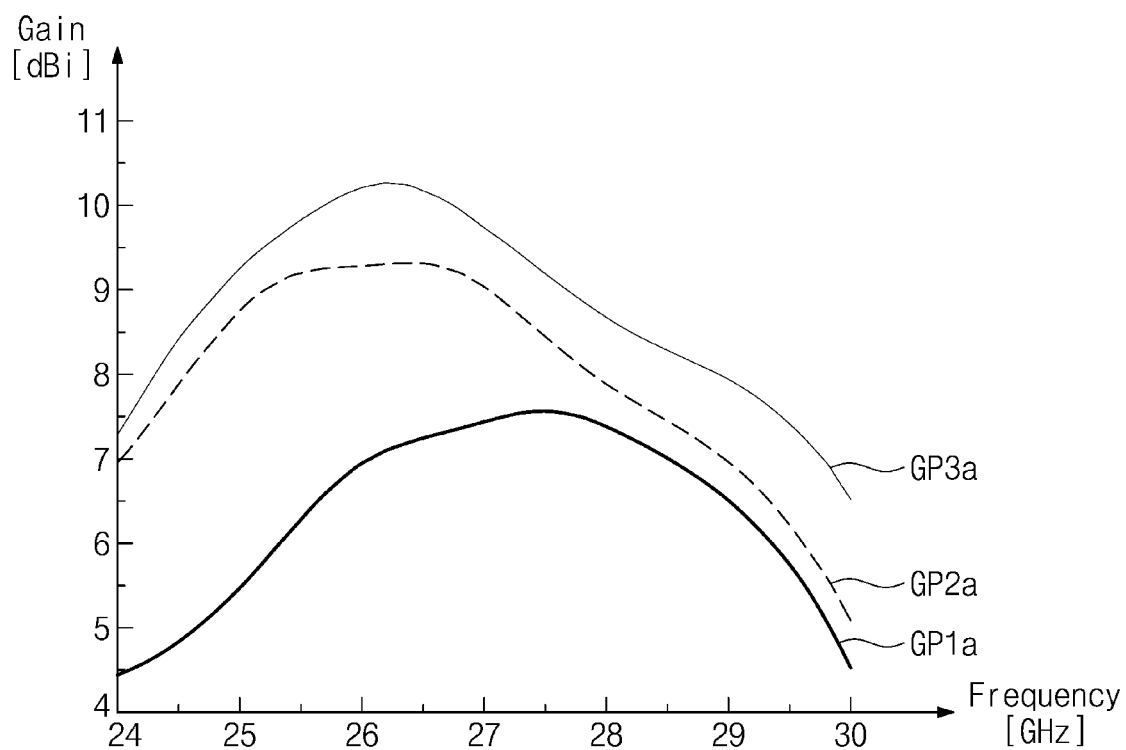
FIG. 15 is a graph of the Boresight gains versus frequency of antennas according to an embodiment of the inventive concept.

FIG. 15 is a graph of the Boresight gain versus frequency of antennas according to an embodiment of the inventive concept.

Referring to FIG. 15, a first graph GP1a illustrates the Boresight gain versus frequency of the first antennas 310a, 310b, 310c, and 310d shown in FIG. 4A, a second graph GP2a illustrates the Boresight gain versus frequency of the antennas 300-Rb shown in FIG. 13, and a third graph GP3a illustrates the Boresight gain versus frequency of the antennas 300-Rc shown in FIG. 14.

The first antennas 310a, 310b, 310c, and 310d shown in FIG. 4A is a 1×4 array antenna, the antennas 300-Rb shown in FIG. 13 is a 2×4 array antenna, and the antennas 300-Rc shown in FIG. 14 is a 3×4 array antenna. The more the number of the patch parts provided in the array antenna increases, the more the antenna gain increases. Accordingly, the number of patch parts provided in the array antenna may be increased for further improving the gain.

Figure 16:
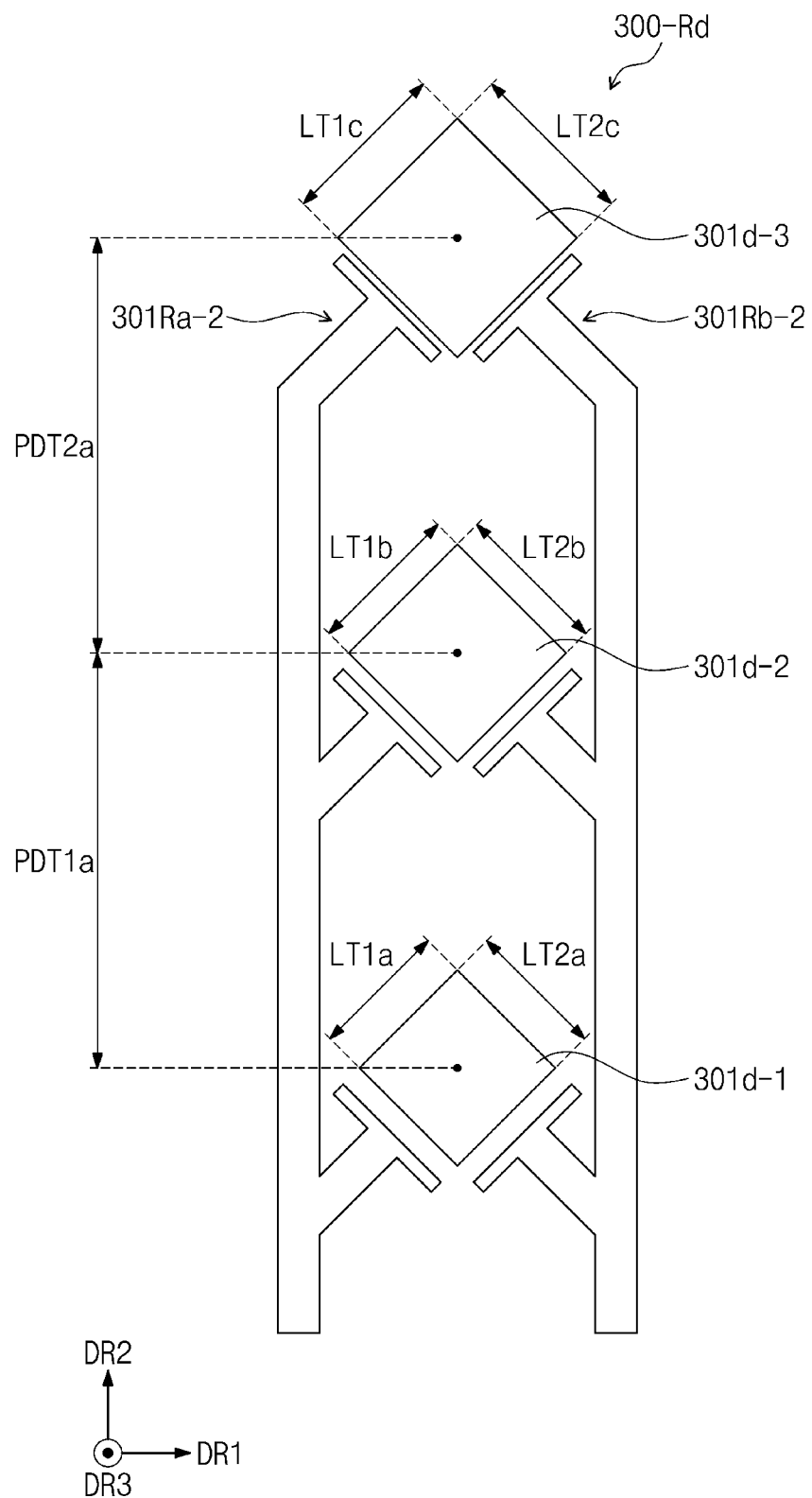
FIG. 16 is a plan view of an antenna according to an embodiment of the inventive concept.

FIG. 16 is a plan view of an antenna according to an embodiment of the inventive concept.

Referring to FIG. 16, an antenna 300-Rd may include a patch part 301d-1, an extension patch part 301d-2, an additional extension patch part 301d-3, a transmission part 301Ra-2, and a symmetric transmission part 301Rb-2. According to the present embodiment, the antenna 300-Rd includes three patch parts 301d-1, 301d-2, and 301d-3.

The extension patch part 301d-2 is spaced apart from the patch part 301d-1 in the second direction DR2, and the additional extension patch part 301d-3 may be spaced apart from the extension patch part 301d-2 in the second direction DR2.

The shapes of the patch part 301d-1, the extension patch part 301d-2, and the additional extension patch part 301d-3 may be the same, but the sizes thereof may be different from each other. For example, the size of the extension patch part 301d-2 may be larger than that of the patch part 301d-1, and the size of the additional extension patch part 301d-3 may be larger than that of the extension patch part 301d-2.

First lengths LT1a, LT1b, LT1c of first sides of the patch part 301d-1, the extension patch part 301d-2, and the additional extension patch part 301d-3 may be different from each other, and second lengths LT2a, LT2b, LT2c of second sides of the patch part 301d-1, the extension patch part 301d-2, and the additional extension patch part 301d-3 may be different from each other. For example, each of the first length LT1a of the first side and the second length LT2a of the second side of the patch part 301d-1 may be about 2.95 mm, each of the first length LT1b of the first side and the second length LT2b of the second side of the extension patch part 301d-2 may be about 3.10 mm, and each of the first length LT1c of the first side and the second length LT2c of the second side of the additional extension patch part 301d-3 may be about 3.27 mm, but they are not limited thereto.

Each of the distance PDT1a between the center of the patch part 301d-1 and the center of the extension patch part 301d-2, and the distance PDT2a between the center of the extension patch part 301d-2 and the center of the additional extension patch part 301d-3 may be designed with a guided wavelength $l_g$.

In the present embodiment, since the patch part 301d-1, the extension patch part 301d-2, and the additional extension patch part 301d-3 have different sizes from each other, they may resonate at different frequencies. Accordingly, each of the distances PDT1a and PDT2a may be designed with a guided wavelength $l_g$ at a specific frequency. For example, the specific frequency may be between the minimum resonance frequency and the maximum resonance frequency among the resonance frequencies of the patch part 301d-1, the extension patch part 301d-2, and the additional extension patch part 301d-3. For example, the specific frequency may be about 27.5 GHz.

The transmission part 301Ra-2 may be symmetrical about a line of symmetry extending along the second direction DR2. Each of the transmission part 301Ra-2 and the symmetric transmission part 301Rb-2 may include a first coupler extending toward the patch part 301d-1, a second coupler extending toward the extension patch part 301d-2, and a third coupler extending toward the additional extension patch part 301d-3. Each of the transmission part 301Ra-2 and the symmetric transmission part 301Rb-2 may be spaced apart from the patch part 301d-1, the extension patch part 301d-2, and the additional extension patch part 301d-3.

According to the present embodiment, the patch part 301d-1, the extension patch part 301d-2, and the additional extension patch part 301d-3 may resonate at different resonance frequencies. Accordingly, each of the transmission part 301Ra-2 and the symmetric transmission part 301Rb-2 may not include a λ/4 transformer matched at the specific frequency. As an example, FIG. 16 illustrates one antenna 300-Rd including three of the patch part 301d-1, the extension patch part 301d-2, and the additional extension patch part 301d-3, but the number of patch parts is not limited thereto. For example, the one antenna 300-Rd may include two patch parts or four or more patch parts.

Figure 17:
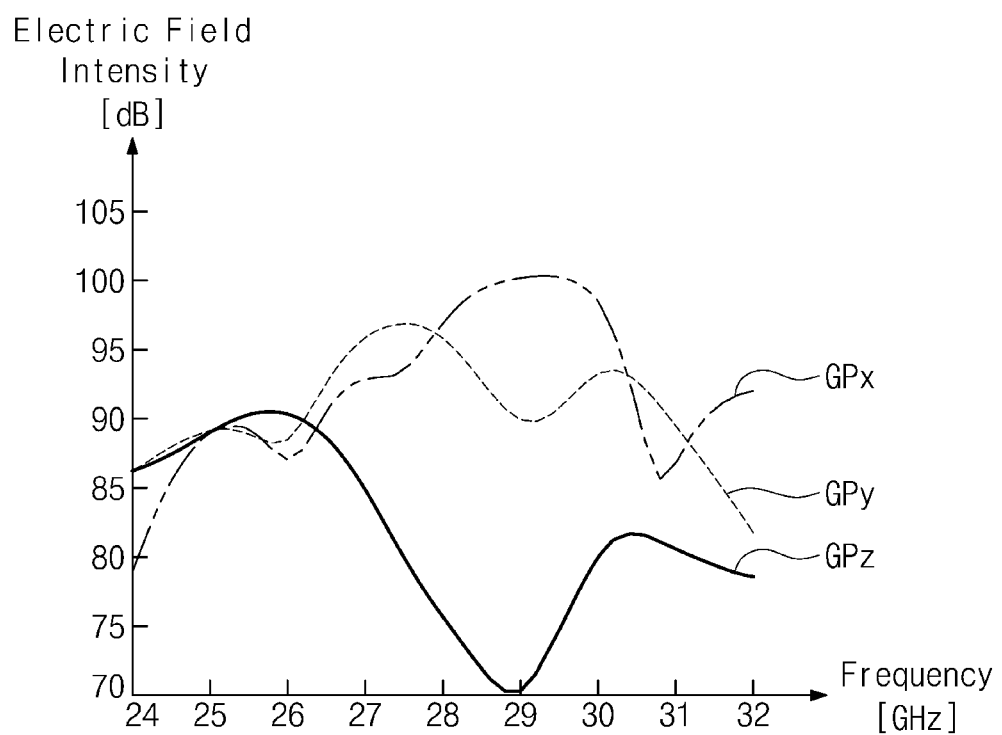
FIG. 17 is a graph showing the electric field intensity versus frequency according to an embodiment of the inventive concept.

FIG. 17 is a graph of the electric field intensity versus frequency according to an embodiment of the inventive concept.

Referring to FIGS. 16 and 17, a first graph GPx illustrates the electric field intensity radiated from the patch part 301d-1 versus frequency, a second graph GPy illustrates the electric field intensity radiated from the extension patch part 301d-2 versus frequency, and a third graph GPz illustrates the electric field intensity radiated from the additional extension patch part 301d-3 versus frequency.

The patch part 301d-1 of which size is the smallest operates at a relatively high frequency, and the additional extension patch part 301d-3 of which size is the largest operates at a relatively low frequency. The patch part 301d-1 may mainly radiate at about 29 GHz, the extension patch part 301d-2 may mainly radiate at about 27 GHz, and the additional extension patch part 301d-3 may mainly radiate at about 25 GHz. In other words, one antenna 300-Rd may operate at a plurality of frequencies. Accordingly, as the patch part 301d-1, the extension patch part 301d-2, and the additional extension patch part 301d-3 resonate at different frequencies, multiple resonances are generated and the operation bandwidth of the antenna 300-Rd may be widened.

Figure 18:
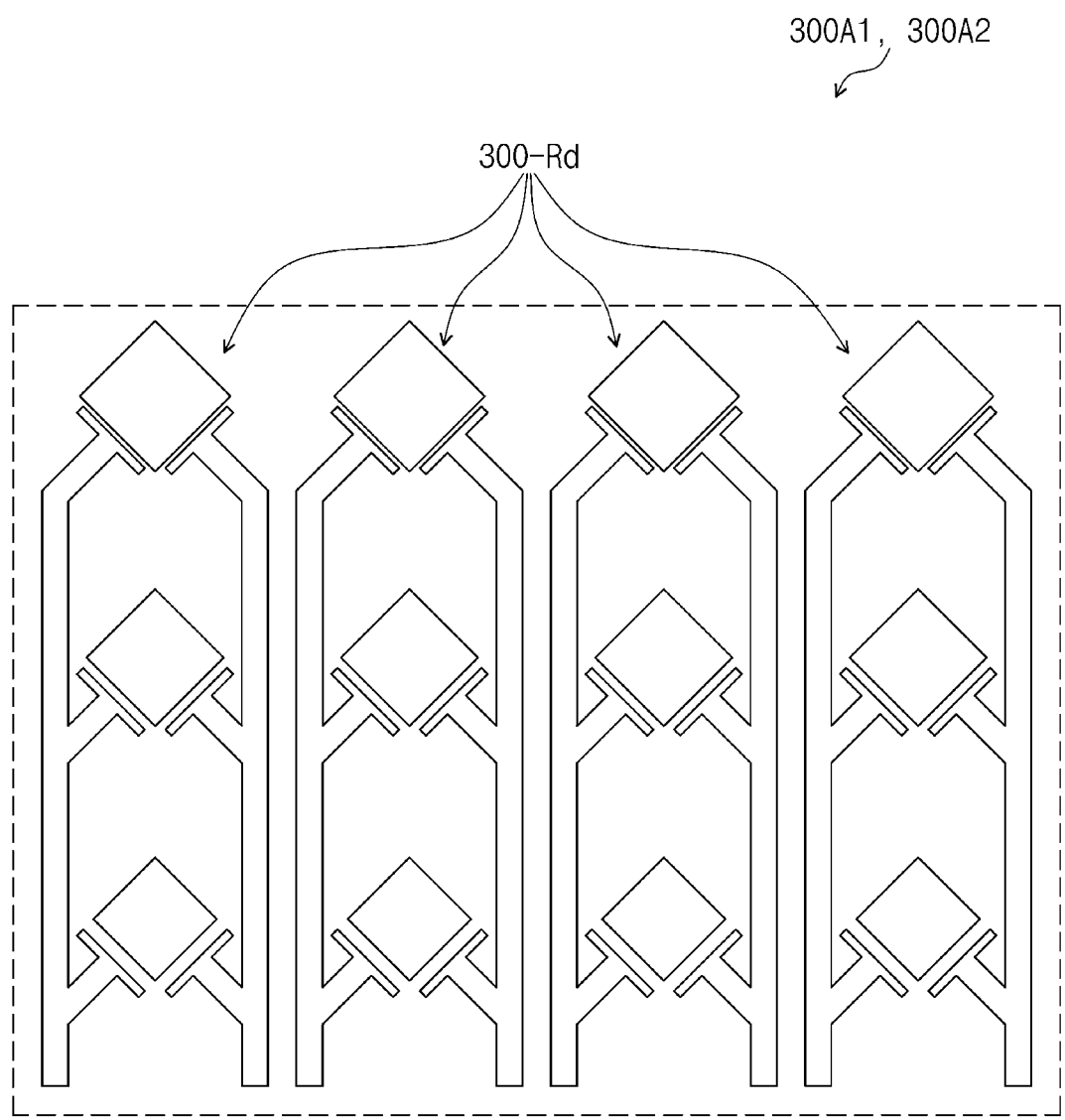
FIG. 18 is an enlarged plan view of antennas disposed in a first antenna area and a second antenna area according to an embodiment of the inventive concept.

FIG. 18 is an enlarged view of antennas disposed in a first antenna area and a second antenna area according to an embodiment of the inventive concept.

Referring to FIG. 18, antennas 300-Rd may be disposed in each of the first antenna area 300A1 and a second antenna area 300A2. The antennas 300-Rd disposed in the first antenna area 300A1 may be referred to as first antennas, and the antennas 300-Rd disposed in the second antenna area 300A2 may be referred to as second antennas. The antennas 300-Rd disposed in each of the first antenna area 300A1 and the second antenna area 300A2 may be a 3×4 array antenna.

According to an embodiment of the inventive concept, the number of patch parts disposed in each of the first antenna area 300A1 and the second antenna area 300A2 may be determined in consideration of the area of each of the first antenna area 300A1 and the second antenna area 300A2. For example, FIG. 18 illustrates that total 12 patch parts are disposed in each of the first antenna area 300A1 and the second antenna area 300A2, but the number of patch parts is not limited thereto. For example, a 4×4 array antenna, a 5×4 array antenna, or a 3×5 array antenna may be disposed in each of the first antenna area 300A1 and the second antenna area 300A2.

Figure 19:
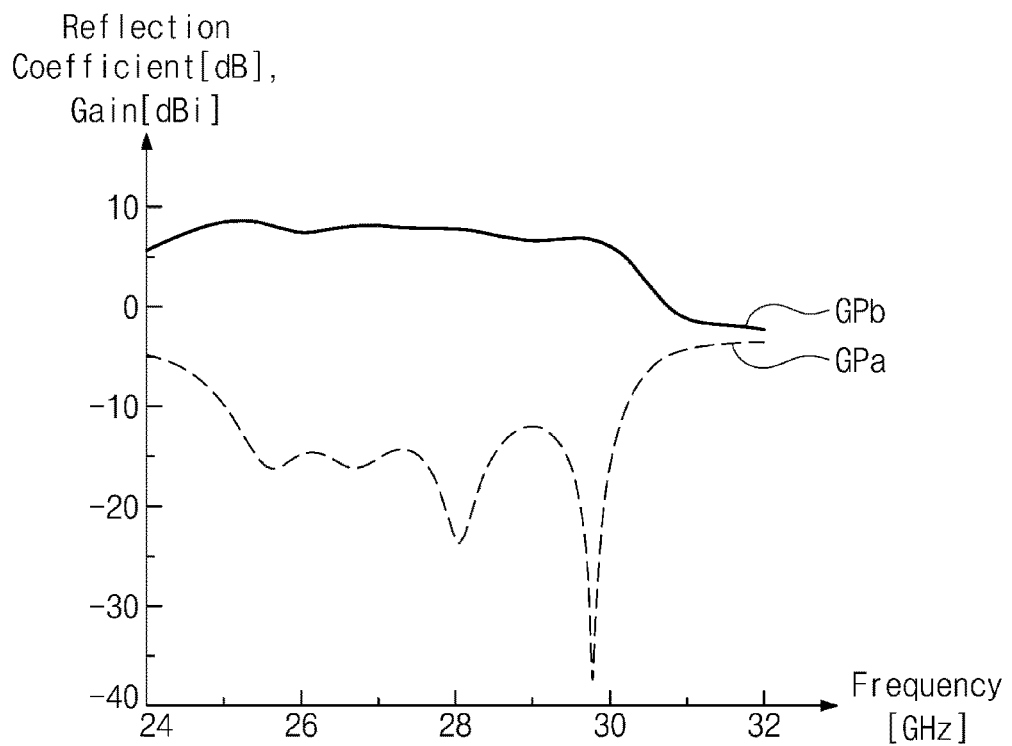
FIG. 19 is a graph of the gain versus frequency according to an embodiment of the inventive concept.
Figure 20:
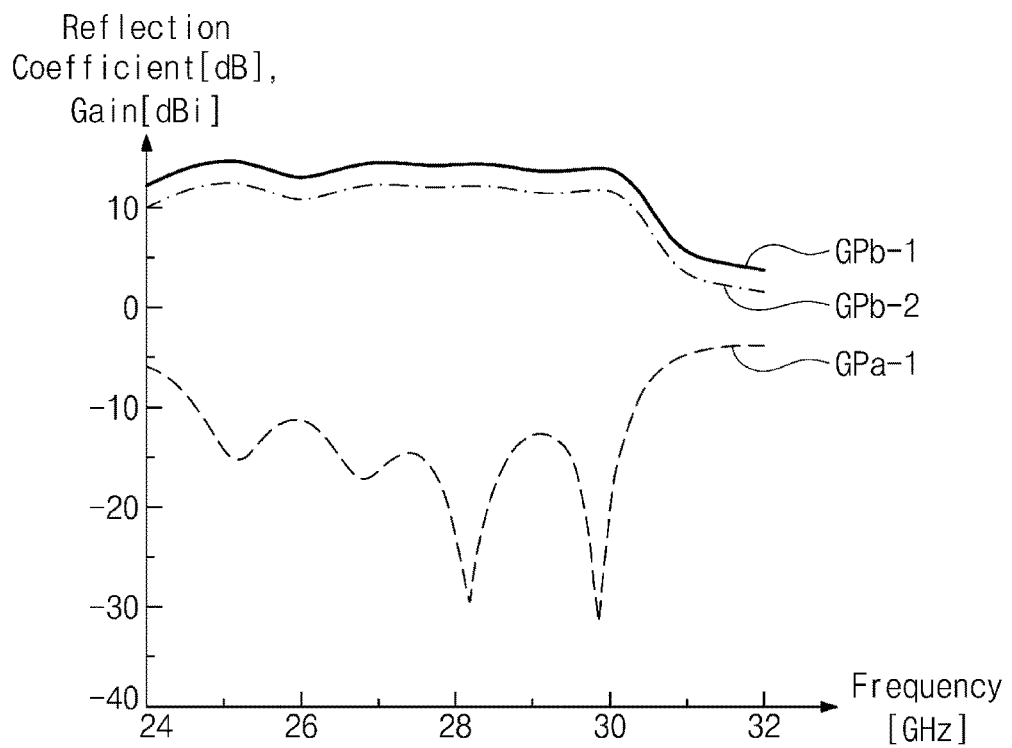
FIG. 20 is a graph of the gain versus frequency according to an embodiment of the inventive concept.

FIG. 19 is a graph of the gain versus frequency according to an embodiment of the inventive concept. FIG. 20 is a graph of the gains versus frequency according to an embodiment of the inventive concept.

Referring to FIGS. 19 and 20, a first graph GPa represents the reflection coefficient versus frequency of the antenna 300-Rd shown in FIG. 16, and a second graph GPa-1 represents the reflection coefficient versus frequency of the array antenna shown in FIG. 18. In the first graph GPa and the second graph GPb, the bandwidth at about −10 dB may be about 25 GHz to about 30.22 GHz.

Referring to FIGS. 19 and 20, a third graph GPb illustrates the antenna gain versus frequency of the antenna 300-Rd shown in FIG. 16, and a fourth graph GPb-1 and a fifth graph GPb-2 illustrate the antenna gains versus frequency of the array antenna shown in FIG. 18. The fourth graph GPb-1 shows the antenna gain when the array antenna shown in FIG. 18 has a solid type, for example, a type in which an opening is not defined, and the fifth graph GPb-2 shows the antenna gain when the array antenna shown in FIG. 18 has a mesh structure as shown in FIG. 5C.

Referring to the third graph GPb, the antenna gain in about 24.1 GHz to about 30 GHz may be 6 dBi or greater. Referring to the fourth graph GPb-1, the antenna gain in about 24.1 GHz to about 30.25 GHz may be about 12 dBi or greater. Referring to the fifth graph GPb-2, the antenna gain in about 24.1 GHz to about 30.25 GHz may be about 10 dBi or greater.

Figure 21:
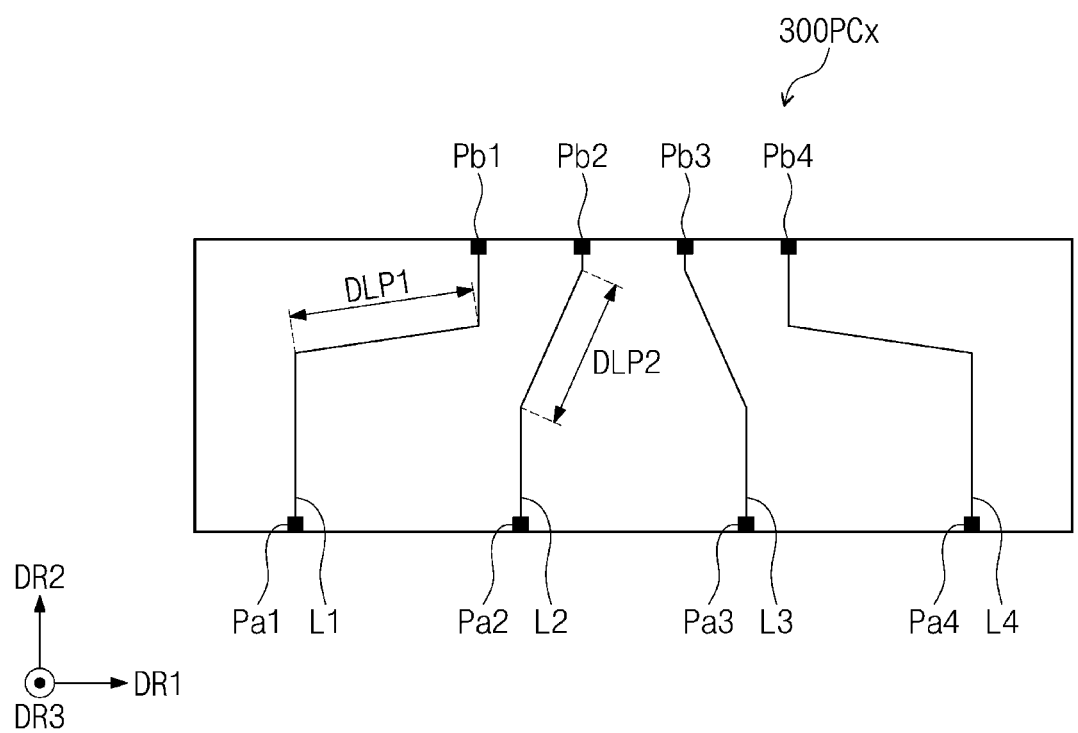
FIG. 21 is a plan view of a circuit film according to an embodiment of the inventive concept.
Figure 22:
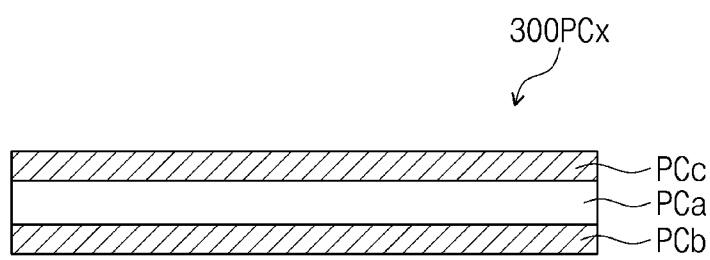
FIG. 22 is a cross-sectional view of a circuit film according to an embodiment of the inventive concept.

FIG. 21 is a plan view of a circuit film according to an embodiment of the inventive concept. FIG. 22 is a cross-sectional view of a circuit film according to an embodiment of the inventive concept.

Referring to FIG. 21, the circuit film 300PCx may include a dielectric layer PCa, a first conductive layer PCb disposed on a first surface of the dielectric layer PCa, and a second conductive layer PCc disposed on a second surface facing the first surface of the dielectric layer PCa.

In one embodiment, the circuit film 300PCx may further include a coverlay. The coverlay may cover at least one of the first conductive layer PCb and the second conductive layer PCc. In one embodiment, the circuit film 300PCx may further include a polyimide pattern layer having more flexible property than the coverlay. For example, a portion of the coverlay is removed, and the polyimide pattern layer may be disposed in the removed area.

Each of the first conductive layer PCb and the second conductive layer PCc may contain copper. The first conductive layer PCb may include a plurality of ports Pa1, Pa2, Pa3, and Pa4, a plurality of opposite ports Pb1, Pb2, Pb3, and Pb4, and a plurality of transmission lines L1, L2, L3, and L4. The second conductive layer PCc may be spaced apart from the plurality of transmission lines L1, L2, L3, and L4 with the dielectric layer PCa interposed therebetween. The second conductive layer PCc may be referred to as a circuit film ground layer.

The plurality of ports Pa1, Pa2, Pa3, and Pa4 may include a first port Pa1, a second port Pa2, a third port Pa3, and a fourth port Pa4, and the plurality of opposite ports Pb1, Pb2, Pb3, and Pb4 may include a first opposite port Pb1, a second opposite port Pb2, a third opposite port Pb3, and a fourth opposite port Pb4.

The plurality of transmission lines L1, L2, L3, and L4 may include a first transmission line L1 connected to the first port Pa1 and the first opposite port Pb1, a second transmission line L2 connected to the second port Pa2 and the second opposite port Pb2, a third transmission line L3 connected to the third port Pa3 and the third opposite port Pb3, and a fourth transmission line L4 connected to the fourth port Pa4 and the fourth opposite port Pb4.

The first transmission line L1 and the fourth transmission line L4 may be symmetrical about a line of symmetry extending along the second direction DR2, and the second transmission line L2 and the third transmission line L4 may be symmetrical about the line of symmetry extending along the second direction DR2. Hereinafter, the first transmission line L1 and the second transmission line L2 will be described, and the description about the third transmission line L3 and the fourth transmission line L4 will be omitted.

The first transmission line L1 may include a first diagonal portion DLP1, and the second transmission line L2 may include a second diagonal portion DLP2. Each of the first diagonal portion DLP1 and the second diagonal portion DLP2 may extend along a direction between the first direction DR1 and the second direction DR2. The first diagonal portion DLP1 and the second diagonal portion DLP2 may be provided so as to reduce the respective lengths of the first transmission line L1 and the second transmission line L2. As each of the lengths of the first transmission line L1 and the second transmission line L2 is reduced, transmission losses in the first transmission line L1 and the second transmission line L2 may be reduced.

The length of the first transmission line L1 may be different from that of the second transmission line L2. The difference in the length between the first transmission line L1 and the second transmission line L2 may be an integer multiple of the guided wavelength derived by using the permittivity of the dielectric layer PCa. In this case, a signal input through the first port Pa1 and output to the first opposite port Pb1 via the first transmission line L1 may be in phase with a signal input through the second port Pa2 and output to the second opposite port Pb2 via the second transmission line L2.

Figure 23:
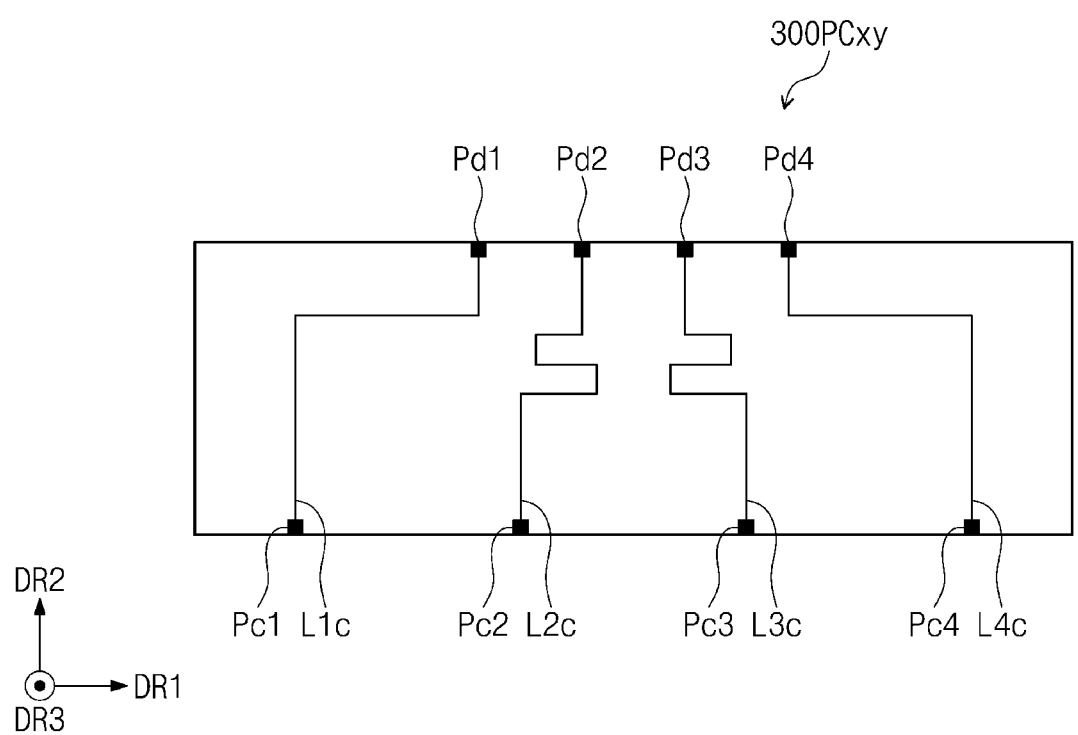
FIG. 23 is a plan view of a circuit film according to a comparative example of the inventive concept.

FIG. 23 is a plan view of a circuit film according to a comparative example of the inventive concept.

Referring to FIG. 23, a circuit film 300 PCxy may include a plurality of ports Pc1, Pc2, Pc3, and Pc4, a plurality of opposite ports Pd1, Pd2, Pd3, and Pd4, and a plurality of transmission lines L1c, L2c, L3c, and L4c.

The lengths of the plurality of transmission lines L1c, L2c, L3c, and L4c may be the same. Accordingly, signals input through the plurality of ports Pc1, Pc2, Pc3, and Pc4 and output to the plurality of opposite ports Pd1, Pd2, Pd3, and Pd4 via the plurality of transmission lines L1c, L2c, L3c, and L4c may have substantially the same phase.

Hereinafter, the plurality of ports Pc1, Pc2, Pc3, and Pc4 may be referred to as first to fourth comparison ports Pc1, Pc2, Pc3, and Pc4, and the plurality of opposite ports Pd1, Pd2, Pd3, and Pd4 may be referred to as first to fourth comparison opposite ports Pd1, Pd2, Pd3, and Pd4. The plurality of transmission lines L1c, L2c, L3c, and L4c may be referred to as first to fourth comparison transmission lines L1c, L2c, L3c, and L4c.

Figure 24:
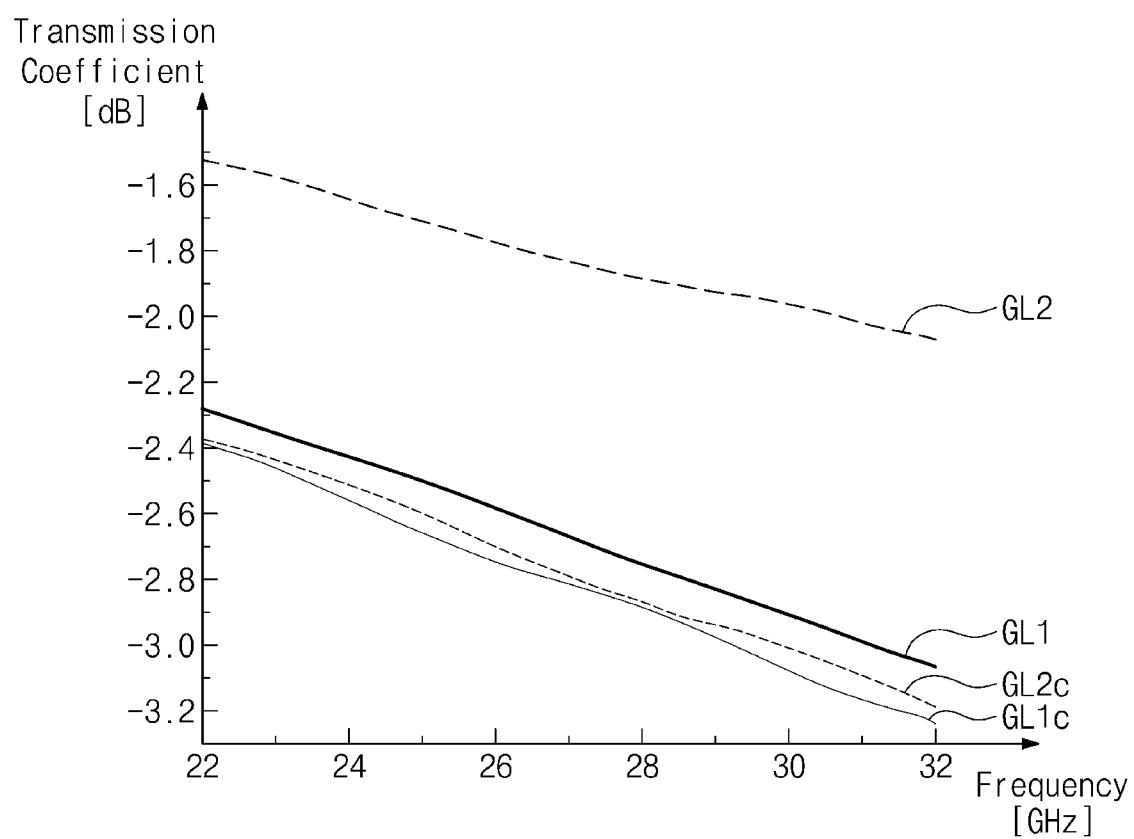
FIG. 24 is a graph of the transmission coefficients (or transfer coefficients) versus frequency of a circuit film according to an embodiment and a circuit film according to a comparative example of the inventive concept.

FIG. 24 is a graph of the transmission coefficients (or transfer coefficients) versus frequency of a circuit film according to an embodiment and a circuit film according to a comparative example of the inventive concept.

Referring to FIGS. 21, 23, and 24, a first graph GL1 illustrates the transmission coefficient versus frequency between the first port Pa1 and the first opposite port Pb1, a second graph GL2 illustrates the transmission coefficient versus frequency between the second port Pa2 and the second opposite port Pb2, a third graph GL1c illustrates the transmission coefficient versus frequency between the first comparison port Pc1 and the first comparison opposite port Pd1, and a fourth graph GL2c illustrates the transmission coefficient versus frequency between the second comparison port Pc2 and the second comparison opposite port Pd2. Thus, the first to fourth graphs GL1, GL2, GL1c, and GL2c are graphs illustrating a parameter $S_{21}$.

Since the length of the first transmission line L1 may be shorter than that of the first comparison transmission line L1c, the transmission loss may be reduced. At about 28 GHz, the transmission loss in the first comparison transmission line L1c may be about −2.89 dB, and the transmission loss in the first comparison transmission line L1 may be about −2.75 dB.

The length of the second transmission line L2 is shorter than that of the second comparison transmission line L2c. In addition, the length of the second transmission line L2 may be shorter by an integer multiple of the guided wavelength than that of the first transmission line L1. The transmission loss of the second transmission line L2 may be further reduced than that of the first transmission line L1 and that of the second comparison transmission line L2c. The transmission loss of the second comparison transmission line L2c may be about −2.87 dB, and the transmission loss of the second transmission line L2 may be about −1.88 dB.

Figure 25:
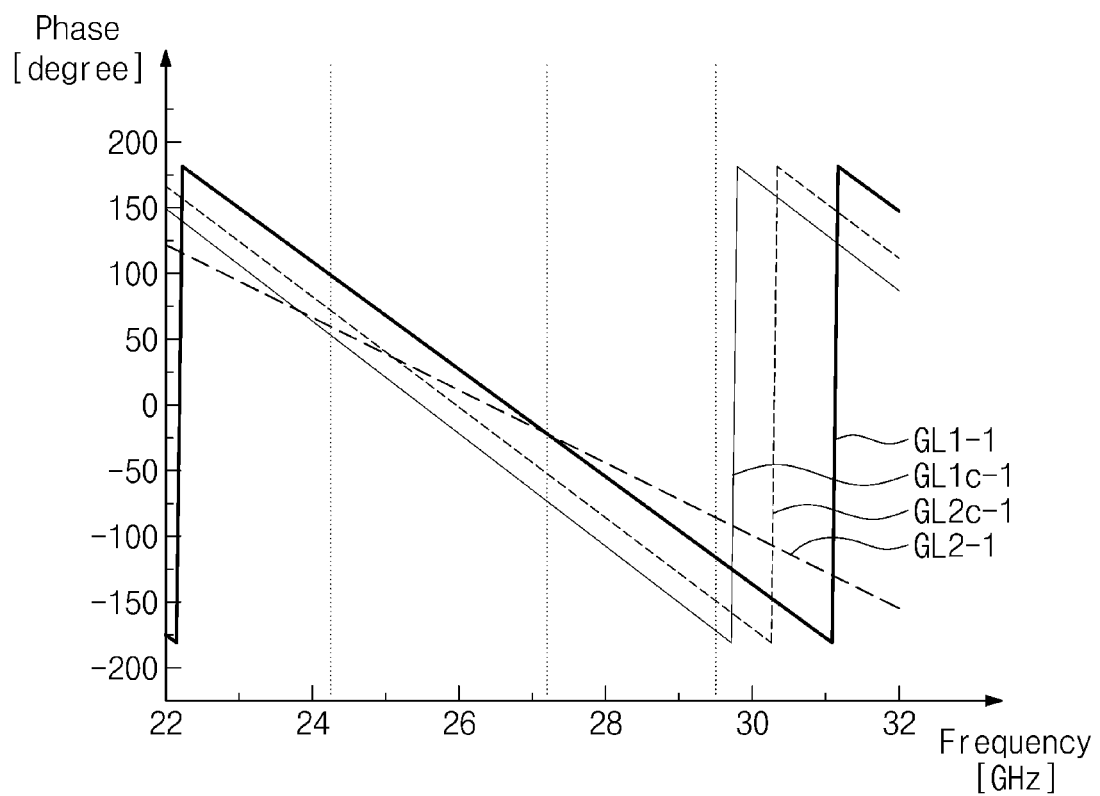
FIG. 25 is a graph of the phases of transmission coefficients versus frequency of a circuit film according to an embodiment and a circuit film of a comparative example of the inventive concept.

FIG. 25 is a graph of the phases of the transmission coefficients versus frequency of a circuit film according to an embodiment and a circuit film according to a comparative example of the inventive concept.

Referring to FIGS. 21, 23, and 25, a first graph GL1 illustrates the phase of the transmission coefficient versus frequency between the first port Pa1 and the first opposite port Pb1, a second graph GL2 illustrates the phase of the transmission coefficient versus frequency between the second port Pa2 and the second opposite port Pb2, a third graph GL1c illustrates the phase of the transmission coefficient versus frequency between the first comparison port Pc1 and the first comparison opposite port Pd1, and a fourth graph GL2c illustrates the phase of the transmission coefficient versus frequency between the second comparison port Pc2 and the second comparison opposite port Pd2.

The length of the first comparison transmission line L1c may be the same as that of the second comparison transmission line L2c. Accordingly, in the third graph GL1c and the fourth graph GL2c, a phase difference between about 25 GHz to about 29.5 GHz may be constant at about 20.89 degrees.

The difference in length between the first transmission line L1 and the second transmission line L2 may be determined on the basis of the guided wavelength at a specific frequency. For example the specific frequency may be about 27.2 GHz. In this case, referring to the first graph GL1 and the second graph GL2, the phase difference may be 0 degree at 27.2 GHz. However, when the frequency changes, the guide wavelength may also be changed. Accordingly, as the frequency changes, the phase difference may be changed.

When the phase of the transmission coefficient is in a range of about −90 degrees to about 90 degrees within a target frequency range, it may be considered that there is no large phase difference. The target frequency is about 24 GHz to about 29.5 GHz, and, referring to the first graph GL1 and the second graph GL2, the phase difference is about 39 degrees at about 24.25 GHz and about −30 degrees at about 29.5 GHz.

While this inventive concept has been described with reference to embodiments thereof, it will be clear to those of ordinary skill in the art to which the inventive concept pertains that various changes and modifications may be made to the described embodiments without departing from the spirit and technical area of the inventive concept as defined in the appended claims and their equivalents. Thus, the scope of the inventive concept shall not be restricted or limited by the foregoing description, but be determined by the broadest permissible interpretation of the following claims.

According to the aforementioned description, an electronic device may include a first antenna including a first patch part and a first transmission part capacitively coupled with the first patch part, and a second antenna including a second patch part and a second transmission part capacitively coupled with the second patch part. In this case, capacitances are generated between the first patch part and the first transmission part and between the second patch part and the second transmission part. In this case, an antenna reactance may gradually change according to frequency. As the result, the fractional bandwidth of the antenna may further increase.

In addition, each feeding direction of the first antennas and the second antennas, each number of the first antennas and the second antennas, or each number of the patch parts included in the first antennas and the second antennas may be adjusted to implement the characteristics of a wide band and a high gain.

Furthermore, the sizes of the patch parts forming one antenna may be different from each other, and in this case, respective patch parts may resonate at different resonance frequencies. Accordingly, the patch parts of different sizes included in one antenna may make multi-resonance and an operating bandwidth of the antenna may be made wide.

Although the embodiments of the present inventive concept have been described, it is understood that the present inventive concept should not be limited to these embodiments but various changes and modifications can be made by one ordinary skilled in the art within the spirit and scope of the present inventive concept as hereinafter claimed.

What is claimed is:

1. An electronic device comprising:
    a display panel; and
    a first antenna disposed on the display panel and comprising a first patch part, a first transmission part, a first additional transmission part, and a first extension patch part spaced apart from the first patch part,
    wherein the first transmission part faces a first side of the first patch part extending in a first cross direction, is spaced apart from the first patch part, and is capacitively coupled with the first patch part,
    wherein the first additional transmission part faces another first side of the first patch part extending in a second cross direction crossing the first cross direction, is symmetrical about a line of symmetry with the first transmission part, and is spaced apart from the first patch part,
    wherein the first transmission part extends toward the first extension patch part, faces a first extension side extending in the first cross direction of the first extension patch part, is spaced apart from the first extension part, and is capacitively coupled to the first extension patch part, and wherein power input through the first transmission part is equally delivered to the first patch part and the first extension patch part.

2. The electronic device according to claim 1, wherein the first antenna is fed through at least any one of the first transmission part and the first additional transmission part.

3. The electronic device according to claim 2, wherein the other of the first transmission part and the first additional transmission part is floated.

4. The electronic device according to claim 1, wherein the first antenna is provided in plural, an interval between a center of a first patch part of one first antenna and a center of a first patch part of another first antenna, which is adjacent to the one first antenna, among a plurality of the first antennas is about 0.5 to about 0.8 times of a reference wavelength.

5. The electronic device according to claim 1, wherein a size of the first extension patch part is equal to or greater than that of the first patch part.

6. The electronic device according to claim 1,
wherein the first antenna further comprises a first additional extension patch part spaced apart from the first patch part with the first extension patch part interposed therebetween,
wherein a size of the first additional extension patch part is equal to or greater than that of the first extension patch part, and the size of the first extension patch part is equal to or greater than that of the first patch part.

7. The electronic device according to claim 1, further comprising:
a ground disposed under the display panel,
wherein a distance between a center of the first patch part and a center of the first extension patch part is a guided wavelength derived by using an effective permittivity between the first antenna and the ground.

8. The electronic device according to claim 1, wherein the first transmission part comprises a $\lambda/4$ transformer.

9. The electronic device according to claim 1, further comprising:
a second antenna disposed on the display panel and comprising a second patch part and a second transmission part,
wherein the second transmission part faces a second side of the second patch part extending in the second cross direction, is spaced apart from the second patch part, and is capacitively coupled to the second patch part.

10. The electronic device according to claim 9,
wherein the second antenna further comprises a second extension patch part spaced apart from the second patch part, and the second transmission part extends toward the second extension patch part, faces a second extension side extending in the second cross direction of the second extension patch part, is spaced apart from the second extension patch part, and is capacitively coupled to the second extension patch part.

11. The electronic device according to claim 9, wherein each of the first antenna and the second antenna is provided in plural, and
wherein a plurality of the first antennas receive or output signals through a first common port, and a plurality of the second antennas receive or output signals through a second common port different from the first common port.

12. The electronic device according to claim 11, further comprising:
a first circuit film comprising the first common port and electrically connected to the plurality of first antennas; and
a second circuit film comprising the second common port and electrically connected to the plurality of second antennas.

13. The electronic device according to claim 9, wherein the first cross direction is orthogonal to the second cross direction and the first transmission part and the second transmission part are symmetrical about a line of symmetry.

14. The electronic device according to claim 9,
wherein the first transmission part comprises a first transmission line and a first coupler extending from the first transmission line and facing the first side of the first patch part, and the second transmission part comprises a second transmission line and a second coupler extending from the second transmission line and facing the second side of the second patch part,
wherein the first transmission line is spaced apart from the second transmission line in a first direction, the first transmission line and the second transmission line extending in parallel to a second direction crossing the first direction,
wherein the first coupler comprises a first extension portion extending along the second cross direction and a first opposite portion extending along the first cross direction, and the second coupler comprises a second extension portion extending from the second transmission line along the first cross direction and a second opposite portion extending along the second cross direction, and
wherein the first opposite portion faces the first side of the first patch part and the second opposite portion faces the second side of the second patch part.

15. The electronic device according to claim 1, wherein the first antenna is provided in plural, and
wherein a plurality of the first antennas receive or output signals respectively through a plurality of ports.

16. The electronic device according to claim 15, further comprising:
a circuit film comprising the plurality of ports,
wherein the circuit film comprises a dielectric layer, a conductive layer and a plurality of transmission lines disposed on a first surface of the dielectric layer, and
wherein the plurality of transmission lines are electrically connected to the plurality of ports, respectively, and a length of a first transmission line among the plurality of transmission lines is longer than that of a second transmission line among the plurality of transmission lines.

17. The electronic device according to claim 16, wherein a difference between the length of the first transmission line and the length of the second transmission line is an integer multiple of a guided wavelength derived by using a permittivity of the dielectric layer.

18. An electronic device comprising:
a display panel; and
a first antenna disposed on the display panel and comprising a first patch part, a first extension patch part spaced apart from the first patch part, a first transmission part, and a first symmetric transmission part, the first transmission part and the first symmetric transmission part being symmetrical about a line of symmetry,
wherein the first transmission part and the first symmetric transmission part are spaced apart in a first direction with the first patch part and the first extension patch part interposed therebetween, and the first extension patch part is spaced apart from the first patch part in a second direction crossing the first direction, and wherein the first patch part and the first extension patch part are fed in-phase.

19. The electronic device according to claim 18, wherein the first transmission part comprises a first $\lambda/4$ transformer adjacent to an output stage facing the first patch part, and a second $\lambda/4$ transformer adjacent to an output stage facing the first extension patch part.

20. The electronic device according to claim 19, further comprising:
a second antenna disposed on the display panel and comprising a second patch part, a second extension patch part spaced apart from the second patch part, a second transmission part, and a second symmetric transmission part, wherein the second transmission part and the second symmetric transmission part are spaced apart in the first direction with the second patch part and the second extension patch part interposed therebetween, wherein the second extension patch part is spaced apart from the second patch part in the second direction, wherein the second transmission part and the first transmission part are symmetrical about a line of symmetry extending in the second direction, and wherein the second symmetric transmission part has a same shape as the first transmission part.

21. The electronic device according to claim 20, wherein the first patch part receives a signal through the first transmission part, the second patch part receives a signal through the second transmission part, and the first symmetric transmission part and the second symmetric transmission part are floated.

22. The electronic device according to claim 18, further comprising:
a circuit film comprising a dielectric layer, a conductive layer disposed on a first surface of the dielectric layer, the conductive layer including a plurality of transmission lines, wherein the first antenna is provided in plural, a plurality of the first antennas receiving respective signals through the plurality of transmission lines, wherein a length of a first transmission line among the plurality of transmission lines is longer than that of a second transmission line among the plurality of transmission lines, and wherein a difference between the lengths of the first transmission line and the second transmission line is an integer multiple of a guided wavelength derived by using a permittivity of the dielectric layer.

23. The electronic device according to claim 18, wherein a size of the first extension patch part is equal to or greater than that of the first patch part.

24. The electronic device according to claim 18, wherein the first antenna further comprises a first additional extension patch part spaced apart from the first patch part with the first extension patch part interposed therebetween, and wherein a size of the first additional extension patch part is equal to or greater than that of the first extension patch part and the size of the first extension patch part is equal to or greater than that of the first patch part.

* * * * *